United States Patent
Kumar et al.

(10) Patent No.: US 12,452,715 B2
(45) Date of Patent: Oct. 21, 2025

(54) EARLY MEASUREMENTS FOR LOGGED MINIMIZATION OF DRIVE TEST

(71) Applicant: QUALCOMM Incorporated, San Diego, CA (US)

(72) Inventors: Rajeev Kumar, San Diego, CA (US); Xipeng Zhu, San Diego, CA (US); Gavin Bernard Horn, La Jolla, CA (US); Punyaslok Purkayastha, San Diego, CA (US); Shankar Krishnan, San Diego, CA (US); Shanshan Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 17/394,564

(22) Filed: Aug. 5, 2021

(65) Prior Publication Data

US 2022/0046456 A1 Feb. 10, 2022

Related U.S. Application Data

(60) Provisional application No. 63/062,291, filed on Aug. 6, 2020.

(51) Int. Cl.
*H04W 24/08* (2009.01)
*H04W 24/10* (2009.01)
*H04W 88/02* (2009.01)

(52) U.S. Cl.
CPC ............ *H04W 24/10* (2013.01); *H04W 88/02* (2013.01)

(58) Field of Classification Search
CPC ...... H04W 24/10; H04W 88/02; H04W 24/08
(Continued)

(56) References Cited

U.S. PATENT DOCUMENTS 9,301,180 B2    3/2016  Suzuki et al.
9,699,682 B2 *  7/2017  Dural .................... H04W 24/10
(Continued)

FOREIGN PATENT DOCUMENTS

CN    102752787 A    10/2012
CN    102783204 A    11/2012
CN    102860062 A    1/2013

OTHER PUBLICATIONS

ZTE Corporation et al: "Discussion on measurement quantities in logged MDT", 3GPP Draft; R2-1903467, vol. RAN WG2, No. Xi'an, China Mar. 29, 2019 (Year: 2019).*
(Continued)

*Primary Examiner* — Sithu Ko
*Assistant Examiner* — Vanneilian Lalchinthang
(74) *Attorney, Agent, or Firm* — Holland & Hart LLP/Qualcomm

(57) ABSTRACT

Methods, systems, and devices for wireless communications are described. A user equipment (UE) in a wireless communications system may perform measurements of a network while in an idle or an inactive state. The UE may receive, from a base station, an idle mode measurement configuration and a logged measurement configuration for performing measurements while the UE is in the idle state or the inactive state. The UE may determine, from the idle mode measurement configuration, that the measurements are to also be used for minimization of drive test (MDT) reporting. The UE may generate an MDT report based on the idle mode measurement configuration and the logged measurement configuration. The UE may transmit, to the base station, the MDT report based on the idle mode measurement configuration.

26 Claims, 16 Drawing Sheets

(58) Field of Classification Search
USPC .......................................................... 370/252
See application file for complete search history.

(56) References Cited

U.S. PATENT DOCUMENTS

| | | | |
|---|---|---|---|
| 12,150,158 | B2 | 11/2024 | Tomala et al. |
| 2012/0307669 | A1* | 12/2012 | Kim ...................... H04W 24/10 370/252 |
| 2013/0295855 | A1* | 11/2013 | Zou ...................... H04W 24/08 455/67.11 |
| 2014/0155057 | A1* | 6/2014 | Xia ...................... H04W 24/10 455/423 |
| 2016/0330644 | A1* | 11/2016 | Li ........................... H04W 4/06 |
| 2020/0221354 | A1* | 7/2020 | Van der Zee ..... H04W 36/0058 |
| 2020/0374736 | A1* | 11/2020 | Fukuta .................. H04W 24/08 |
| 2020/0404521 | A1* | 12/2020 | Kim ...................... H04W 24/08 |
| 2022/0132332 | A1* | 4/2022 | Zhang .................. H04B 17/318 |
| 2022/0217563 | A1* | 7/2022 | Teyeb ................... H04W 24/08 |
| 2022/0232410 | A1* | 7/2022 | Fang ..................... H04W 24/10 |
| 2023/0030697 | A1* | 2/2023 | Hu ........................ H04B 17/104 |

OTHER PUBLICATIONS

International Search Report and Written Opinion—PCT/US2021/044918—ISA/EPO—Feb. 21, 2022.
Ericsson (Rapporteur): "Summary of Email Discussion[106#37] [NR/DCCA]: UE Behaviour Regarding Idle Measurement Configurations and Measurement Results,", 3GPP Draft, 3GPP TSG-RAN WG2#107, R2-1910290—Email Discussion 106#37NR-DCCA—UE Behaviouridle Meas, 3rd Generation Partnership Project (3GPP), Mobile Competence Centre, 650, Route Des Lucioles, F-06921, Sophia-Antipolis Cedex, France, vol. RAN WG2, No. Prague, Czech Republic, Aug. 26, 2019-Aug. 30, 2019, Aug. 15, 2019 (Aug. 15, 2019), XP051768069, 30 pages, Retrieved from the Internet: URL: http://www.3gpp.org/ftp/tsg_ran/WG2_RL2/TSGR2_107/Docs/R2-1910290.zip [retrieved on Aug. 15, 2019] case 2, p. 13.
Huawei (Summary Rapporteur): "Report of [AT113-e] [844] [NR/R17 SON/MDT] Logged MDT part I", 3GPP Draft, 3GPP TSG-RAN WG2 Meeting #113 electronic, R2-2102143, 3rd Generation Partnership Project (3GPP), Mobile Competence Centre, 650, Route Des Lucioles, F-06921, Sophia-Antipolis Cedex, France, vol. RAN WG2, No. electronic, Jan. 25, 2021-Feb. 5, 2021, Feb. 5, 2021 (Feb. 5, 2021), XP051978161, 13 pages, Retrieved from the Internet: URL: https://ftp.3gpp.org/tsg_ran/WG2_RL2/TSGR2_113-e/Inbox/R2-2102143.zip R2-2102143 Report of 844 Logged MDT part I.doc [retrieved on Feb. 5, 2021] the whole document.
Partial International Search Report—PCT/US2021/044918—ISA/EPO—Dec. 6, 2021.
Qualcomm Inc: "Logged MDT Enhancements", 3GPP Draft, 3GPP TSG-RAN WG3 Meeting #112e, R3-212127, 3rd Generation Partnership Project (3GPP), Mobile Competence Centre, 650, Route Des Lucioles, F-06921, Sophia-Antipolis Cedex, France, vol. RAN WG3, No. E-Meeting, May 17, 2021-May 27, 2021, May 7, 2021 (May 7, 2021), XP052002321, 11 pages, Retrieved from the Internet: URL: https://ftp.3gpp.org/tsg_ran/WG3_lu/TSGR3_112-e/Docs/R3-212127.zip R3-212127—Logged MDT enhancements.docx [retrieved on May 7, 2021] the whole document.
Qualcomm Inc (Moderator): "Summary of Offline Discussion on CB: #1214_SONMDT_MDT-MR-DC", 3GPP Draft, 3GPP TSG-RAN WG3 #112-e, R3-212876, R3-212670, 3rd Generation Partnership Project (3GPP), Mobile Competence Centre, 650, Route Des Lucioles, F-06921, Sophia-Antipolis Cedex, France, vol. RAN WG3, No. Online, May 17, 2021-May 28, 2021, Jun. 4, 2021 (Jun. 4, 2021), XP052021675, 9 pages, Retrieved from the Internet: URL: https://ftp.3gpp.org/tsg_ran/WG3_lu/TSGR3_112-e/Docs/R3-212876.zip R3-212876 SoD for CB # 1214_SONMDT_MDT-MR-DC_summary.doc [retrieved on—Jun. 4, 2021], the whole document.
Qualcomm Incorporated: "Logged Measurement Enhancements," 3GPP Draft, 3GPP TSG-RAN WG2 Meeting #113-e, R2-2101341, 3rd Generation Partnership Project (3GPP), Mobile Competence Centre, 650, Route Des Lucioles, F-06921, Sophia-Antipolis Cedex, France, vol. RAN WG2, No. Electronic; Jan. 25, 2021-Feb. 5, 2021, Jan. 15, 2021 (Jan. 15, 2021), XP051974271, 4 pages, Retrieved from the Internet: URL: https://ftp.3gpp.org/tsg_ran/WG2_RL2/TSGR2_113-e/Docs/R2-2101341.zip R2-2101341—Logged measurement Enhancements.docx [retrieved on Jan. 15, 2021], the whole document.
Qualcomm Incorporated: "Open Issues in MDT," 3GPP Draft, 3GPP TSG-RAN WG2 Meeting #111-e, R2-2007072, 3rd Generation Partnership Project (3GPP), Mobile Competence Centre, 650, Route Des Lucioles, F-06921, Sophia-Antipolis Cedex, France, vol. RAN WG2, No. Electronic, Aug. 17, 2020-Aug. 28, 2020, Aug. 7, 2020 (Aug. 7, 2020), XP051911899, 4 pages, Retrieved from the Internet: URL: https://ftp.3gpp.org/tsg_ran/WG2_RL2/TSGR2_111-e/Docs/R2-2007072.zip R2-2007072—Open Isuues in MDT.docx [retrieved on Aug. 7, 2020] the whole document.
Samsung: "MDT for Early Measurments (Logged, Immediate)," 3GPP Draft, 3GPP TSG-RAN WG2#108 meeting, R2-1915734, 3rd Generation Partnership Project (3GPP), Mobile Competence Centre, 650, Route Des Lucioles, F-06921, Sophia-Antipolis Cedex, France, vol. RAN WG2, No. Reno, USA; Nov. 14, 2019-Nov. 18, 2019, Nov. 7, 2019 (Nov. 7, 2019), XP051817324, 3 pages, Retrieved from the Internet: URL : https://ftp.3gpp.org/tsg_ran/WG2_RL2/TSGR2_108/Docs/R2-1915734.zip R21915734 on MDT for early measurements—Logged and irrmediate.docx [retrieved on Nov. 7, 2019] proposals 1-3, p. 1-p. 2.
ZTE Corporation, et al., "Discussion on Measurement Quantities in Logged MDT", 3GPP Draft, 3GPP TSG-RAN WG2 Meeting #105bis, R2-1903467, Discussion on Measurement Quantities in Logged MDT, 3rd Generation Partnership Project (3GPP), Mobile Competence Centre, 650, Route Des Lucioles, F-06921, Sophia-Antipolis Cedex, France, vol. RAN WG2. No. Xi 'an. China, Apr. 8, 2019-Apr. 12, 2019, Mar. 29, 2019 (Mar. 29, 2019), XP051692735, 5 pages, Retrieved from the Internet: URL: http://www.3gpp.org/ftp/tsg%5Fran/WG2%5FRL2/TSGR2%5F105bis/Docs/R2%2D1903467%2Ezip [retrieved on Mar. 29, 2019], proposal 1, 2, p. 2-p. 3.
European Search Report—EP23204644—Search Authority—Munich—Feb. 12, 2024.
3GPP TS 38.331: "3rd Generation Partnership Project, Technical Specification Group Radio Access Network, NR, Radio Resource Control (RRC) Protocol Specification (Release 16)", TS 38.331 V16.1.0, Jul. 2020, 910 Pages.
Ericsson (Rapporteur): "Summary of Email Discussion [106#37][NR/DCCA]: UE Behaviour Regarding Idle Measurement Configurations and Measurement Results", 3GPP TSG-RAN WG2#107, R2-1910290, Prague, Czech Republic, Aug. 26, 2019-Aug. 30, 2019, Aug. 16, 2019, pp. 1-31, pp. 1-3.
Nokia., et al., "Logged MDT for RRC_INACTIVE State", R2-1913545, R2-1910709, 3GPP TSG-RAN WG2 Meeting #107bis Chongqing, China, Oct. 14-18, 2019, 5 Pages.
Samsung: "MDT for Early Measurments (Logged, Immediate)", 3GPP TSG-RAN WG2#108 meeting, Tdoc R2-1915734 (Same As R2-1913251), Reno, USA, Nov. 14, 2019-Nov. 18, 2019, Nov. 8, 2019, 3 pages, p. 13.

\* cited by examiner

EARLY MEASUREMENTS FOR LOGGED MINIMIZATION OF DRIVE TEST

CROSS REFERENCE

The present Application for Patent claims the benefit of U.S. Provisional Patent Application No. 63/062,291 by KUMAR et al., entitled "EARLY MEASUREMENTS FOR LOGGED MINIMIZATION OF DRIVE TEST," filed Aug. 6, 2020, assigned to the assignee hereof, and expressly incorporated by reference herein.

FIELD OF TECHNOLOGY

The following relates to wireless communications, including early measurements for logged minimization of drive test (MDT), i.e., logging the measurements on non-cell reselection frequencies and cells in a logged MDT report.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may perform idle mode measurements on radio access technologies (RATs) and neighboring frequencies of the UE. The UE may transmit reports of the measurements to a base station.

SUMMARY

The described techniques relate to improved methods, systems, devices, and apparatuses that support early measurements for logged minimization of drive test (MDT). Generally, the described techniques provide for a user equipment (UE) in a wireless communications system performing measurements of a network while in an idle or an inactive state. The UE may receive, from a base station, an idle mode measurement configuration and a logged measurement configuration for performing measurements while the UE is in an idle state or an inactive state. The UE may determine, from the idle mode measurement configuration, that the measurements are to be used for MDT reporting. The UE may generate one or more idle mode measurement reports, as well as an MDT report, based on the idle mode measurement configuration and the logged measurement configuration. The UE may transmit, to the base station, the one or more idle mode measurement reports and the MDT report based on the idle mode measurement configuration.

A method for wireless communications at a UE is described. The method may include receiving, from a base station, an idle mode measurement configuration and a logged measurement configuration for performing measurements while the UE is in an idle state or an inactive state, determining, from the idle mode measurement configuration, that the measurements are to be also used for MDT reporting, generating an MDT report based on the idle mode measurement configuration and the logged measurement configuration, and transmitting, to the base station, the MDT report based on the idle mode measurement configuration and the logged measurement configuration.

An apparatus for wireless communications at a UE is described. The apparatus may include a processor, memory coupled with the processor, and instructions stored in the memory. The instructions may be executable by the processor to cause the apparatus to receive, from a base station, an idle mode measurement configuration and a logged measurement configuration for performing measurements while the UE is in an idle state or an inactive state, determine, from the idle mode measurement configuration, that the measurements are to be also used for MDT reporting, generate an MDT report based on the idle mode measurement configuration and the logged measurement configuration, and transmit, to the base station, the MDT report based on the idle mode measurement configuration and the logged measurement configuration.

Another apparatus for wireless communications at a UE is described. The apparatus may include means for receiving, from a base station, an idle mode measurement configuration and a logged measurement configuration for performing measurements while the UE is in an idle state or an inactive state, means for determining, from the idle mode measurement configuration, that the measurements are to be also used for MDT reporting, means for generating an MDT report based on the idle mode measurement configuration and the logged measurement configuration, and means for transmitting, to the base station, the MDT report based on the idle mode measurement configuration and the logged measurement configuration.

A non-transitory computer-readable medium storing code for wireless communications at a UE is described. The code may include instructions executable by a processor to receive, from a base station, an idle mode measurement configuration and a logged measurement configuration for performing measurements while the UE is in an idle state or an inactive state, determine, from the idle mode measurement configuration, that the measurements are to be also used for MDT reporting, generate an MDT report based on the idle mode measurement configuration and the logged measurement configuration, and transmit, to the base station, the MDT report based on the idle mode measurement configuration and the logged measurement configuration.

In some examples of the method, apparatuses, and non-transitory computer-readable medium described herein, determining that the measurements may be to be also used for MDT reporting may include operations, features, means, or instructions for identifying that the idle mode measurement configuration includes a flag that may be indicative that the idle mode measurement configuration may be to be also used for MDT reporting.

In some examples of the method, apparatuses, and non-transitory computer-readable medium described herein, determining that the measurements may be to be used for MDT reporting may include operations, features, means, or instructions for receiving a logged measurement configuration that indicates that the UE may be to use the idle mode measurement configuration for obtaining the measurements to be used for MDT reporting and the generation of the MDT report.

In some examples of the method, apparatuses, and non-transitory computer-readable medium described herein, determining that the measurements may be to be used for MDT reporting may include operations, features, means, or instructions for receiving a logged measurement configuration that includes at least one of frequency or cell information included in the idle mode measurement configuration, where the measurements may be based on the logged measurement configuration and the idle mode measurement configuration.

Some examples of the method, apparatuses, and non-transitory computer-readable medium described herein may further include operations, features, means, or instructions for identifying one or more neighbor radio access technologies (RATs), one or more neighbor frequencies, or combination thereof, measuring one or more of the neighbor RATs, one or more of the neighbor frequencies, or a combination thereof, measuring a RAT of the UE, a frequency of the UE, or both, and transmitting the MDT report.

Some examples of the method, apparatuses, and non-transitory computer-readable medium described herein may further include operations, features, means, or instructions for receiving a system information block (SIB) transmission from the base station including an updated idle mode measurement configuration and overwriting the idle mode measurement configuration based on determining, from the updated idle mode measurement configuration, that the measurements may be to be used for MDT reporting.

Some examples of the method, apparatuses, and non-transitory computer-readable medium described herein may further include operations, features, means, or instructions for refraining from measuring the one or more neighbor RATs, the one or more neighbor frequencies, or the combination thereof, where the one or more neighbor RATs, the one or more neighbor frequencies, or the combination thereof may be based on the idle mode measurement configuration and initiating measurement of one or more of the neighbor RATs, one or more of the neighbor frequencies, or a combination thereof, where the one or more of the neighbor RATs, one or more of the neighbor frequencies, or the combination thereof may be based on the updated idle mode measurement configuration.

In some examples of the method, apparatuses, and non-transitory computer-readable medium described herein, the refraining from measuring may be based on identifying that an MDT timer may be not running.

Some examples of the method, apparatuses, and non-transitory computer-readable medium described herein may further include operations, features, means, or instructions for refraining from measuring the one or more neighbor RATs, the one or more neighbor frequencies, or a combination thereof, where the one or more neighbor RATs, the one or more neighbor frequencies, or the combination thereof may be based on the updated idle mode measurement configuration, measuring the RAT of the UE, the frequency of the UE, or both, based on determining that an MDT timer may be not running, receiving a request for the MDT report, and transmitting the MDT report including the measurement of the RAT of the UE, the measurement of the frequency of the UE, or both.

Some examples of the method, apparatuses, and non-transitory computer-readable medium described herein may further include operations, features, means, or instructions for transmitting the MDT report including the measurement of the one or more neighbor RATs, the measurement of the one or more neighbor frequencies, or a combination thereof, and the measurement of the RAT of the UE, the measurement of the frequency of the UE, or both.

Some examples of the method, apparatuses, and non-transitory computer-readable medium described herein may further include operations, features, means, or instructions for identifying that an MDT timer may be running, identifying one or more neighbor RATs, neighbor frequencies, or combination thereof, and generating the MDT report, where the MDT report includes the measurement of the one or more neighbor RATs, the one or more neighbor frequencies, or a combination thereof, based on determining, from the idle mode measurement configuration, that the measurements may be to be used for MDT reporting.

Some examples of the method, apparatuses, and non-transitory computer-readable medium described herein may further include operations, features, means, or instructions for receiving a SIB transmission from the base station including an updated idle mode measurement configuration, refraining from measuring the one or more neighbor RATs, the one or more neighbor frequencies, or a combination thereof, and initiating measurement of a RAT of the UE, a frequency of the UE, or both, based on determining that the MDT timer may be running and based on receiving the SIB transmission including the updated idle mode measurement configuration.

Some examples of the method, apparatuses, and non-transitory computer-readable medium described herein may further include operations, features, means, or instructions for receiving a request of the MDT report and transmitting the MDT report including the measurement of the RAT of the UE, the frequency of the UE, or both.

A method for wireless communications at a base station is described. The method may include identifying an idle mode measurement configuration for a UE to perform measurements in an idle state or an inactive state of the UE, transmitting, to the UE, the idle mode measurement configuration for the UE to perform measurements while in the idle mode, and receiving, from the UE, an MDT report based on the idle mode measurement configuration and a logged measurement configuration.

An apparatus for wireless communications at a base station is described. The apparatus may include a processor, memory coupled with the processor, and instructions stored in the memory. The instructions may be executable by the processor to cause the apparatus to identify an idle mode measurement configuration for a UE to perform measurements in an idle state or an inactive state of the UE, transmit, to the UE, the idle mode measurement configuration for the UE to perform measurements while in the idle mode, and receive, from the UE, an MDT report based on the idle mode measurement configuration and a logged measurement configuration.

Another apparatus for wireless communications at a base station is described. The apparatus may include means for identifying an idle mode measurement configuration for a UE to perform measurements in an idle state or an inactive state of the UE, means for transmitting, to the UE, the idle mode measurement configuration for the UE to perform measurements while in the idle mode, and means for receiving, from the UE, an MDT report based on the idle mode measurement configuration and a logged measurement configuration.

A non-transitory computer-readable medium storing code for wireless communications at a base station is described. The code may include instructions executable by a processor to identify an idle mode measurement configuration for a UE to perform measurements in an idle state or an inactive state of the UE, transmit, to the UE, the idle mode measurement configuration for the UE to perform measurements while in the idle mode, and receive, from the UE, an MDT report based on the idle mode measurement configuration and a logged measurement configuration.

Some examples of the method, apparatuses, and non-transitory computer-readable medium described herein may further include operations, features, means, or instructions for transmitting a logged measurement configuration that indicates that the UE may be to use the idle mode measurement configuration for obtaining the measurements to be used for MDT reporting.

Some examples of the method, apparatuses, and non-transitory computer-readable medium described herein may further include operations, features, means, or instructions for transmitting a logged MDT configuration that includes at least one of frequency or cell information included in the idle mode measurement configuration, where the measurements may be based on the logged MDT configuration, which may be based on the idle mode measurement configuration.

Some examples of the method, apparatuses, and non-transitory computer-readable medium described herein may further include operations, features, means, or instructions for transmitting a SIB transmission from the base station including an updated idle mode measurement configuration.

Some examples of the method, apparatuses, and non-transitory computer-readable medium described herein may further include operations, features, means, or instructions for receiving the MDT report including a measurement of one or more of neighbor RATs of the UE, a measurement of the one or more of neighbor frequencies of the UE, or a combination thereof.

Some examples of the method, apparatuses, and non-transitory computer-readable medium described herein may further include operations, features, means, or instructions for transmitting a request for the MDT report and receiving the MDT report including the measurement of a RAT of the UE, the measurement of a frequency of the UE, or both.

Some examples of the method, apparatuses, and non-transitory computer-readable medium described herein may further include operations, features, means, or instructions for transmitting the MDT report to a trace collection entity.

In some examples of the method, apparatuses, and non-transitory computer-readable medium described herein, the MDT report includes a flag indicating that measurements of the MDT report may be collected using the idle mode measurement configuration.

Some examples of the method, apparatuses, and non-transitory computer-readable medium described herein may further include operations, features, means, or instructions for receiving the MDT report including a measurement of one or more neighbor RATs of the UE, a measurement of the one or more neighbor frequencies of the UE, or a combination thereof, and a measurement of a RAT of the UE, a measurement of a frequency of the UE, or both.

In some examples of the method, apparatuses, and non-transitory computer-readable medium described herein, identifying the idle mode measurement configuration may include operations, features, means, or instructions for receiving an indication of the MDT report configuration from an operations, administration and, maintenance network device.

In some examples of the method, apparatuses, and non-transitory computer-readable medium described herein, the operations, administration, and maintenance network device relays the MDT report configuration to the base station through an access and mobility management function.

DETAILED DESCRIPTION

Figure 1:
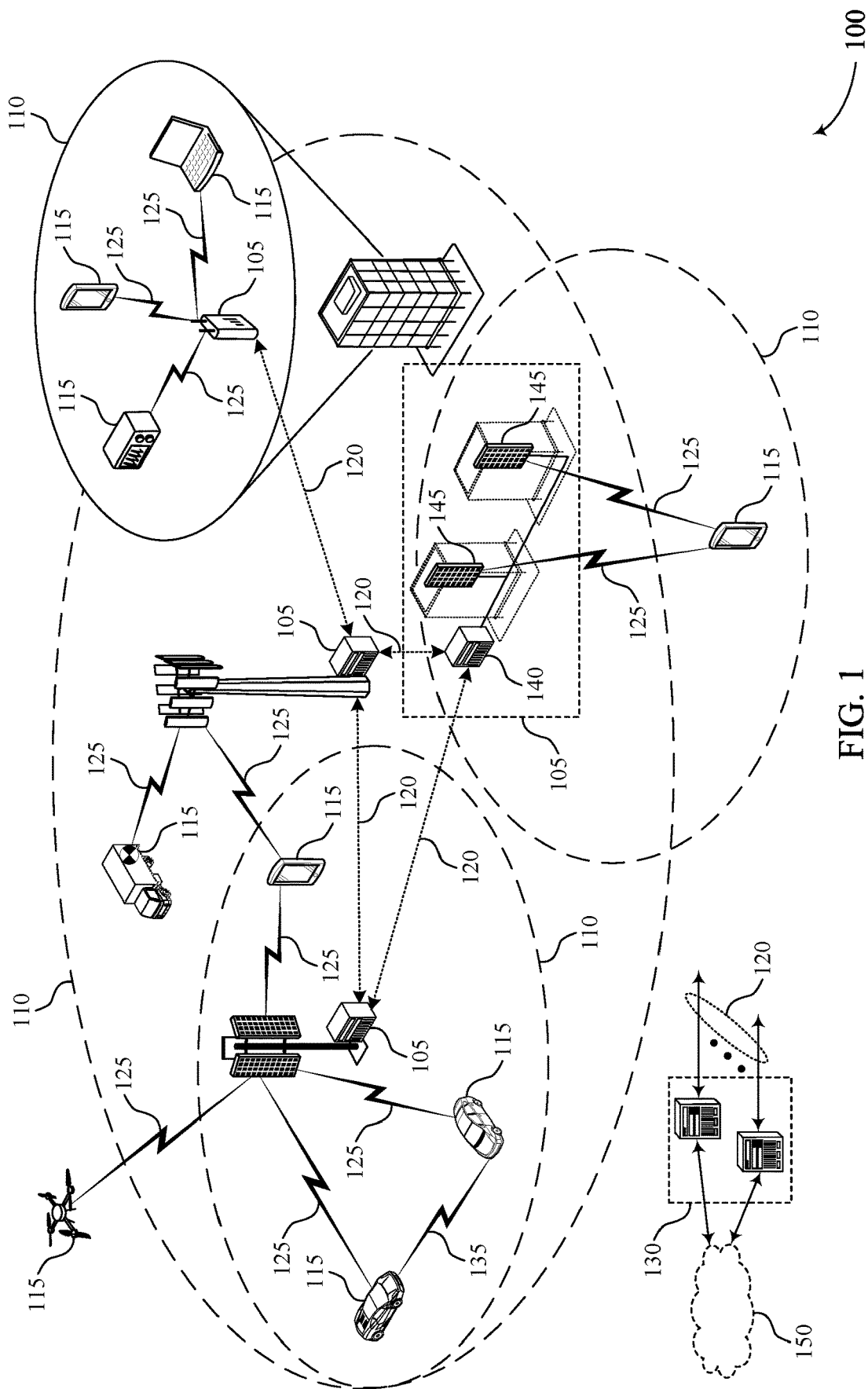
FIG. 1 illustrates an example of a system for wireless communications that supports early measurements for logged minimization of drive test (MDT) in accordance with aspects of the present disclosure.

Some wireless communications systems may support a minimization of drive test (MDT) to test wireless communications quality in an area. Using MDT, a network may collect radio measurements to autonomously optimize network performance. Some systems may use immediate MDT, where a user equipment (UE) may be configured to take measurements and immediately report the measurements to a serving cell. Additionally, or alternatively, a system may utilize a logged MDT, where a device takes measurements and then later sends a measurement report with the measurements, where the measurements may be used for a logged MDT purpose. The report of the logged MDT may include periodic or event-triggered measurements.

Additionally, wireless communications may also support dual connectivity carrier aggregation (DCCA). In order to facilitate a more efficient or quick establishment of DCCA, a UE may obtain measurements in advance of the DCCA establishment. In particular, these early measurements may be obtained while the UE is in an idle or inactive state.

A UE may be configured to perform the early measurements, also referred to herein as idle mode measurements. Idle mode measurements may refer to early measurements taken in an idle state and an inactive state. Additionally, or alternatively, as explained herein, the configuration for the idle mode measurements may also be used for logging early measurements for MDT purposes. The UE may receive the idle mode measurement configuration from a base station, and the idle mode measurement configuration may include configuration information for performing measurements while the UE is in an idle or an inactive state. For example, the early measurement configuration may be received in radio resource control (RRC) release signaling from the base station, or in a system information block (SIB) transmission. The UE may determine, from the idle mode measurement configuration, that the measurements may also be used for logged MDT reporting. For example, the UE may determine that the measurements may be used for logged MDT reporting based on whether location information is configured in the idle mode measurement configuration, or based on a flag included in the idle mode measurement configuration. The UE may generate multiple idle mode measurement reports (based on the different idle mode measurement configurations and updated configurations). Additionally, or alternatively, the UE may generate an MDT report (based on a logged MDT configuration, or based on a logged MDT configuration along with an updated idle mode measurement configuration). In this regard, the UE may be configured to generate and transmit the idle mode measurement reports and the MDT report independently from one another. The UE may transmit the reports to the base station.

The UE may measure radio access technologies (RATs) of neighboring areas or of the RAT for which the UE is configured to perform wireless communications. Similarly, the UE may also measure neighboring frequencies, or the frequency that the UE is configured to use. The measurements of the neighboring RATs or the RAT of the UE, as well as the measurements of the neighboring frequencies or the frequency of the UE, or a combination of these, may be included in the idle mode measurement reports (e.g., an early measurement report), the logged MDT report, or both.

Aspects of the disclosure are initially described in the context of wireless communications systems. Aspects of the disclosure are then described with respect to process flows. Aspects of the disclosure are further illustrated by and described with reference to apparatus diagrams, system diagrams, and flowcharts that relate to early measurements for logged MDT.

FIG. 1 illustrates an example of a wireless communications system 100 that supports early measurements for logged MDT in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular RAT (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different RATs.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may perform measurements of a network while in an idle or an inactive state. The UE 115 may receive, from a base station 105, an idle mode measurement configuration and a logged measurement configuration for performing measurements while the UE 115 is in an idle state or an inactive state. The UE 115 may determine, from the idle mode measurement configuration, that the measurements are to be also used for MDT reporting. The UE 115 may generate one or more idle mode measurement reports, an MDT report, or both, based on the idle mode measurement configuration and the logged measurement configuration. The UE 115 may transmit, to the base station 105, the one or more idle mode measurement reports, the MDT report, or both, based on the idle mode measurement configuration and the logged measurement configuration.

Figure 2:
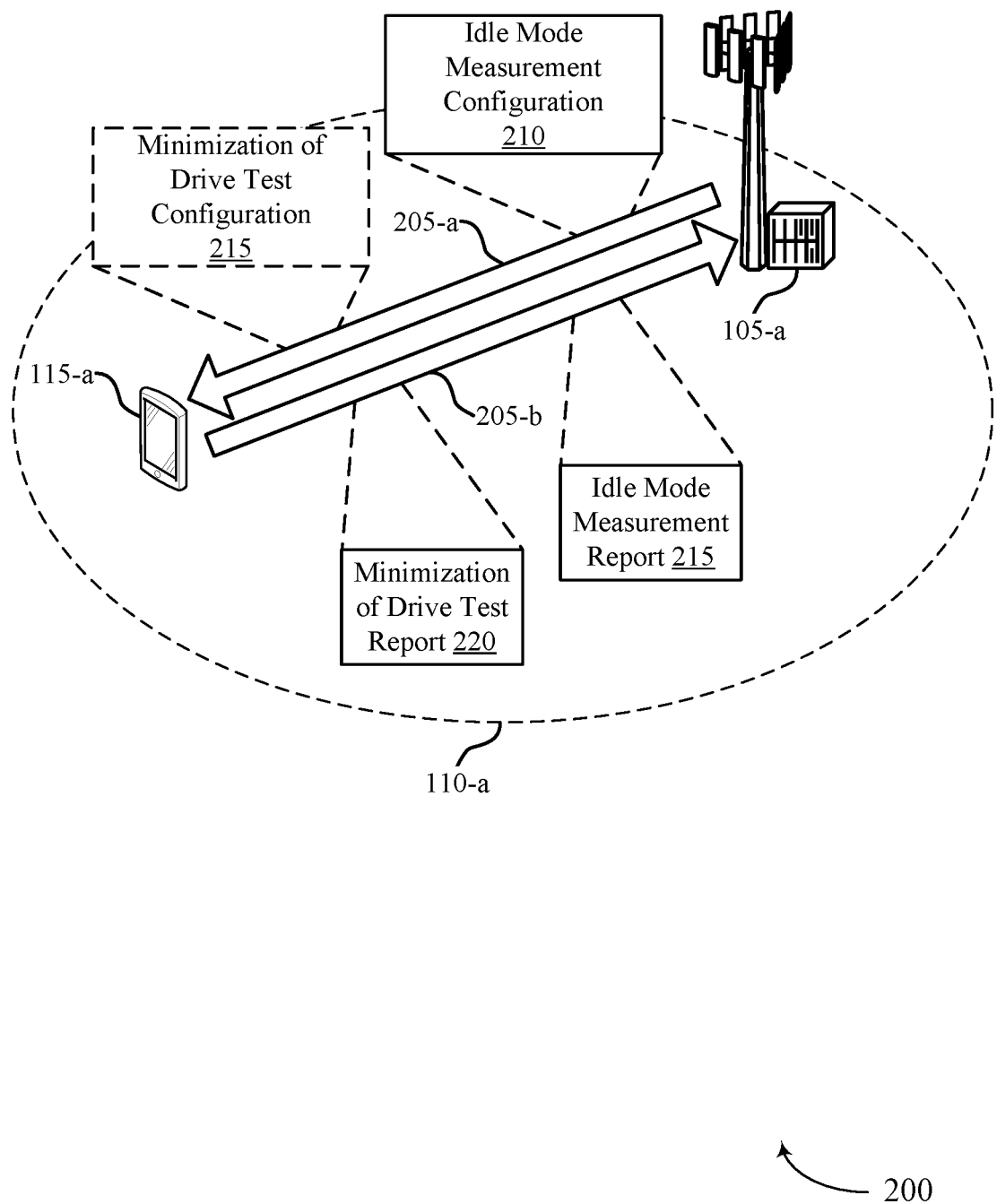
FIG. 2 illustrates an example of a wireless communications system that supports early measurements for logged MDT in accordance with aspects of the present disclosure.

FIG. 2 illustrates an example of a wireless communications system 200 that supports early measurements for logged MDT in accordance with aspects of the present disclosure. In some examples, wireless communications system 200 may implement aspects of wireless communication system 100. Wireless communications system 200 may include UE 115-a and base station 105-a, which may be examples of a UE 115 and a base station 105 as described with reference to FIG. 1, respectively.

The base station 105-a may communicate with UE 115-a may transmitting signals over downlink channel 205-a. The UE 115-a may communicate with base station 105-a by transmitting signal over uplink channel 205-b. The UE 115-a may perform early measurements that may also be used for MDT reporting, such as logged MDT reporting. For example, based on a capability of UE 115-a, the early measurements may be captured by UE 115-a and used for MDT purposes. Thus, logged MDT measurements may be enhanced.

The base station 105-a may transmit an indication of idle mode measurement configuration 210 to the UE 115-a. The UE 115-a may determine whether idle mode measurement configuration 210 may also be applicable to MDT reporting. In some cases, the base station 105-a may transmit idle mode measurement configuration 210 with location information. The location information may indicate that the UE 115-a may also use idle mode measurement configuration 210 for performing logged MDT reporting. In other cases, the base station 105-a may include a flag (e.g., earlyMeasForLoggedMDT flag) in the idle mode measurement configuration 210 indicating whether the UE 115-a may also use idle mode measurement configuration 210 for logged MDT purposes and reporting.

The idle mode measurement configuration 210 may include an indication or carrier lists, such as NR carriers or E-UTRA carriers, as well as a validity area for performing the measurements. In some cases, the base station 105-a may transmit the idle mode measurement configuration 210 in RRC release signaling. In these cases, the UE 115-a may use the idle mode measurement configuration 210 received in the RRC release signaling. After receiving the RRC release message, the UE 115-a may perform idle mode measurements according to the idle mode measurement configuration 210 while in an idle state or an inactive state.

In other cases, the UE 115-a may receive the idle mode measurement configuration 210 is a SIB transmission (e.g., in SIB11 or SIB16) from the base station 105-a. If the UE 115-a receives both an RRC release message and a SIB transmission with the configuration, the UE 115-a may use the configuration received in the RRC release message, and may ignore the configuration received in the SIB transmission. Further idle mode measurement configurations 210 may be updated by idle mode measurement configurations 210 received in subsequent SIB transmissions.

In cases where the idle mode measurement configuration 210 is for logged MDT reporting, the UE 115-a may additionally or alternatively generate an early measurement report for logged MDT reporting. This early measurement report may include an idle mode measurement report 215. The UE 115-a may include a timestamp or a cell identity in the idle mode measurement report 215, which the base station 105-a may use to determine whether the idle mode measurement report 215 was used by the UE 115-a for DCCA enhancement. The UE 115-a may include location information the in idle mode measurement report 215. The location information may include global navigation satellite system (GNSS), wireless local area network (WLAN), Bluetooth, and sensor location information. A configuration for each of these parameters may be included in the idle mode measurement configuration 210. The base station 105-a may ignore the location information in the report in cases where the base station 105-a identifies that the UE 115-a used idle mode measurement report 215 for DCCA. The base station 105-a may report the idle mode measurement report 215 to a trace collection entity (TCE), and may indicate that the report was obtained by the UE 115-a using the idle mode measurement configuration.

Further, the UE 115-a may report the idle mode measurement report 215 using the latest received idle mode measurement configuration 210, and may indicate to the base station 105-a that there are more idle mode measurement reports 215 available. In some cases, the base station 105-a may indicate an intent to receive multiple idle mode measurement reports 215 simultaneously, and may request more idle mode measurement reports 215 from the UE 115-a by transmitting an information request to the UE 115-a (e.g., by transmitting a UEInformationRequest message).

Multiple different idle mode measurements (e.g., for idle mode measurement reports 215) may be stored by the UE 115-a, if the previous idle mode measurement configuration 210 is overwritten by a new configuration. For example, the base station 105-a may send a SIB with an updated idle mode measurement configuration 210. The UE 115-a may store previous reports with a timestamp or a cell identity, or both, and may transmit the report to the base station 105-a upon request from the base station 105-a.

In some cases, the base station 105-a may transmit an MDT configuration 215 to the UE 115-a. The MDT configuration 215 may be an example of a logged measurement configuration (e.g., loggedMeasurementConfiguration). The MDT configuration 215 may also be referred to as a logged MDT configuration. The MDT configuration 215 may indicate to the UE 115-a whether the idle mode measurement configuration 210 may also be used by the UE 115-a for MDT reporting. Further, the MDT configuration 215 may include frequency and cell information that the UE 115-a may use to perform idle mode measurements.

For example, before the UE 115-a receives an RRC release message, the UE 115-a may use the idle mode measurement configuration 210 for generating and reporting idle mode measurement reports, including measurements of neighboring RATs and frequencies. The UE 115-*a* may also obtain a list of neighboring RATs and frequencies for an MDT report 220. The UE 115-*a* may obtain the list of neighboring RATs and frequencies solely based on the MDT configuration 215 (e.g., the logged measurement configuration), or based on the MDT configuration 215 and the idle mode measurement configuration 210). Once the UE 115-*a* receives the MDT configuration 215, the UE 115-*a* may collect the RAT and frequency measurements according to the MDT configuration 215, which may include RATs and frequencies for MDT reporting, which may be different from the RATs and frequencies includes in the idle mode measurement configuration 210. While the UE 115-*a* is in an idle or inactive state (e.g., after receiving the RRC release message). If a logged MDT timer is running, the UE 115-*a* may discard the previous measurement configuration (e.g., from an original idle mode measurement configuration).

In some cases, when the logged MDT timer is running, the UE 115-*a* may use the idle mode measurement configuration 210 to report radio resource measurements (RRMs) on neighboring RATs and frequencies. The UE 115-*a* may then receive the MDT configuration 215, and may use the MDT configuration 215 to obtain a list of neighboring RATs and frequencies for generating and transmitting the MDT report 220. Once the UE 115-*a* receives an updated idle mode measurement configuration, the UE 115-*a* may refrain from measuring the neighboring RATs and frequencies, which may have been configured in a previous idle mode measurement configuration 210. The UE 115-*a* may overwrite the idle mode measurement configuration 210 (e.g., with an updated idle mode measurement configuration 210 received in a SIB), and may add measurement for a RAT of the UE 115-*a* and a frequency of the UE 115-*a* to report via the MDT report 220.

In some cases, the UE 115-*a* may not be able to receive MDT configuration, and in these cases the idle mode measurement configuration 201 may not be considered for MDT reporting purposes. In some cases, the UE 115-*a* may obtain MDT measurements by combining the neighboring RAT measurements and neighboring frequency measurements. In these cases, the UE 115-*a* may create and generate a single report which may combine the information in the idle mode measurement report 215 and the MDT report 220. The UE 115-*a* may transmit the combined report to the base station 105-*a*. As noted previously herein, the UE 115-*a* may be configured to generate and transmit the idle mode measurement reports 215 and the MDT report 220 separately and/or independently from one another.

Figure 3:
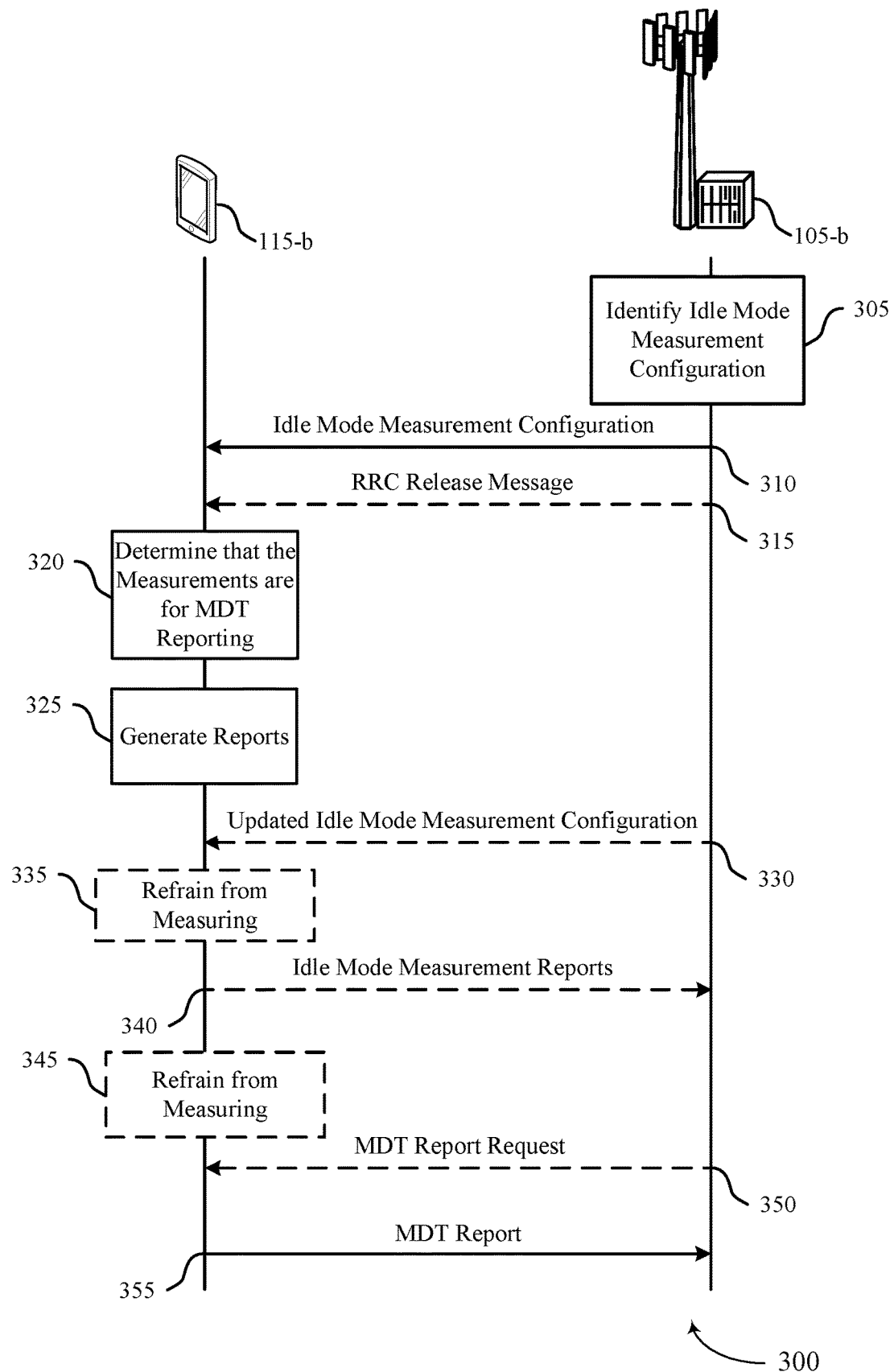
FIG. 3 illustrates an example of a process flow that supports early measurements for logged MDT in accordance with aspects of the present disclosure.

FIG. 3 illustrates an example of a process flow 300 that supports early measurements for logged MDT in accordance with aspects of the present disclosure. In some examples, process flow 300 may implement aspects of wireless communications systems 100 and 200. Process flow 300 includes a UE 115-*b*, which may be an example of a UE 115 as described with reference to FIGS. 1 and 2. Process flow 300 also includes a base station 105-*b*, which may be and example of base stations 105 as described with reference to FIGS. 1 and 2. The UE 115-*a* and the base station 105-*b* may communicate over downlink and uplink channels.

At 305, the base station 105-*b* may identify an idle mode measurement configuration for the UE 115-*b* to perform measurements in an idle state or an inactive state of the UE 115-*b*. In some cases, the base station 105-*b* may receive an indication of an MDT report configuration from an operations, administration, and maintenance (OAM) network device. The OAM may transmit the MDT report configuration to the base station through an access and mobility function (AMF).

At 310, the UE 115-*b* may receive, from the base station 105-*b*, an idle mode measurement configuration for performing measurements while the UE 115-*b* is in an idle state or an inactive state. The UE 115-*b* may receive the idle mode measurement configuration as part of a SIB transmission from the base station 105-*b*. The UE 115-*b* may also receive the idle mode measurement configuration as part of an RRC release message transmitted from the base station 105-*b*. In some cases, the UE 115-*b* may receive both a SIB transmission from the base station 105-*b* and an RRC release message transmitted from the base station 105-*b*, where both the SIB and the RRC release message include respective idle mode measurement configurations.

At 320, the UE 115-*b* may determine, from the idle mode measurement configuration, that the measurements are to be also used for MDT reporting. In some cases, the UE 115-*b* may identify that the idle mode measurement configuration, received at 310, includes location information. In these cases, the UE 115-*b* may determine that the idle mode measurement configuration is to be also used for MDT reporting (e.g., logged MDT reporting) based on the idle mode measurement configuration including the location information. In other cases, the UE 115-*b* may identify that the idle mode measurement configuration includes a flag that may be indicative that the idle mode measurement configuration is to be also used for MDT reporting.

In cases where the UE 115-*b* receives idle mode configurations in both a SIB transmission and an RRC release message from the base station 105-*b*, the UE 115-*b* may identify the idle mode measurement configuration from the RRC release message. For example, the UE 115-*b* may ignore the idle mode measurement configuration from the SIB transmission.

The UE 115-*b* may also receive a logged measurement configuration, which may indicate that the UE 115-*b* is to use the idle mode measurement configuration for obtaining the measurements to be used for MDT reporting and the generation of the MDT report.

The UE 115-*b* may receive a logged measurement configuration that includes at least one of a frequency or cell information included in the idle mode measurement configuration, where the measurements may be based on the logged measurement configuration and the idle mode measurement configuration and the logged measurement configuration.

At 325, the UE 115-*b* may generate one or more idle mode measurement reports, an MDT report, or both, based on the idle mode measurement configuration. For example, in some cases, the UE 115-*b* may generate a logged MDT report based on the idle mode measurement configuration and logged MDT configuration and may report only the latest measurement based on the idle mode measurement configuration in the idle mode measurement report. In other cases, the UE 115-*b* may generate one or more idle mode measurement reports based on the logged idle mode configuration and the MDT report based on the idle mode measurement and logged MDT configurations.

The UE 115-*b* may identify one or more neighbor RATs, one or more neighbor frequencies, or a combination of these, based on the logged MDT configuration and the idle mode measurement configuration. For example, the UE 115-*b* may obtain a list of the neighbor RATs, neighbor frequencies, or both, based on the logged MDT configuration and the idle mode measurement configuration. The UE 115-*b* may measure one or more of the neighbor RATs, one or more of the neighbor frequencies, or a combination of these. The UE 115-b may also measure a RAT of the UE 115-b, and frequency of the UE 115-b, or both.

In some cases, the UE 115-b may identify that an MDT timer is running. In these cases, the UE 115-b may identify one or more neighbor RATs, neighbor frequencies, or a combination of these. The UE 115-b may generate the MDT report at 325, wherein the MDT report includes the measurement of the one or more neighbor RATs, the one or more neighbor frequencies, or a combination of these, based on determining, from the idle mode measurement configuration, that the measurements are to be used for logged MDT reporting.

At 330, the UE 115-b may receive a SIB transmission from the base station 105-b including an updated idle mode measurement configuration. The UE 115-b may overwrite the idle mode configuration (received at 310) based on the updated idle mode measurement configuration.

At 335 upon the reception of updated idle mode measurement configuration, the UE 115-b may refrain from logging measurements on the one or more neighbor RATs, the one or more neighbor frequencies, or the combination in the logged MDT report, where the one or more neighbor RATs, the one or more neighbor frequencies, or the combination, are based on the idle mode measurement configuration based on identifying that an MDT timer is not running. If the T330 timer is not running, the UE 115-b may be configured to log measurements only in the idle mode measurement report. Otherwise, at 335 upon the reception of updated idle mode measurement configuration, the UE 115-b may initiate measurement of a different set of one or more neighbor RATs, one or more neighbor frequencies, or a combination, based on the updated idle mode measurement configuration. The set of one or more neighbor RATs and one or more neighbor frequencies may be based on the updated idle mode measurement configuration.

In additional or alternative aspects, if the timer T330 is running, the UE 115-b may be configured to update logged configuration by including idle mode measurement configuration. This may be compared with the behavior or the UE 115-b described above in cases where the T330 timer is not running.

At 340, the UE 115-b may transmit the one or more idle mode measurement reports. The idle mode measurement reports may include location information. In some cases, the UE 115-b may transmit a most recently generated idle mode measurement reports, based on the one or more idle mode measurement reports transmitted at 340. The UE 115-b may transmit, to the base station 105-b, an indication that additional ones or the one or more idle measurement reports may be available for transmission to the base station 105-b.

In some cases, the UE 115-b may receive, from the base station 105-b, an indication that the UE 115-b is to transmit multiple idle mode measurement reports to the base station 105-b. The UE 115-b may then transmit, to the base station 15-b, at least a set of the one or more idle mode measurement reports based on receipt of the indication. Each of the set of the one or more idle mode measurement reports may be associated with a timestamp or a cell identifier.

The base station 105-b may identify that the UE 115-b transmitted the one or more idle mode measurement reports to perform DCCA. In these cases, the base station 105-b may ignore the location information included in the idle mode measurement reports.

Further, at 345, the UE 115-b may refrain from measuring the one or more neighbor RATs, the one or more neighbor frequencies, or the combination, that were based on the updated idle mode configuration received at 330 upon an expiry of an idle mode measurement timer T331. The UE 115-b may keep logging measurements on the RAT of the UE 115-b, the frequency of the UE 115-b, or both, in the logged MDT report, based on determining that an MDT timer is still running. Further, update of the measurement logging of the different RAT by the UE 115-b, or the frequencies by the UE 115-b, or both, in the logged MDT report, may be based on determining that the MDT timer is running, and based on receiving the SIB including the update idle mode measurement configuration. Moreover, in some aspects, the UE 115-b may be configured to update the logged MDT configuration by removing idle mode measurement configuration if the T330 timer is running and the T331 timer is expired.

At 350, the UE 115-b may receive a request for the MDT report. The UE 115-b may transmit, at 355, the MDT report based on the idle mode measurement configuration. The MDT report may include the measurement of the RAT of the UE 115-b, the frequency of the UE 115-b, or both. The MDT report may also include measurements of the one or more neighbor RATs, the one or more neighbor frequencies, or a combination of these, along with, or without, the measurement of the RAT of the UE 115-b or the measurement of the frequency of the UE 115-b.

The base station 105-b may transmit the one or more idle mode measurement reports to a trace collection entity (TCE), where the one or more idle mode measurement report are to be used for MDT reporting. The base station 105-b may also transmit the MDT report to the TCE. The base station 105-b may indicate, to the TCE, that the one or more idle mode measurement reports are collected with or associated with the idle mode measurement configuration.

Figure 4:
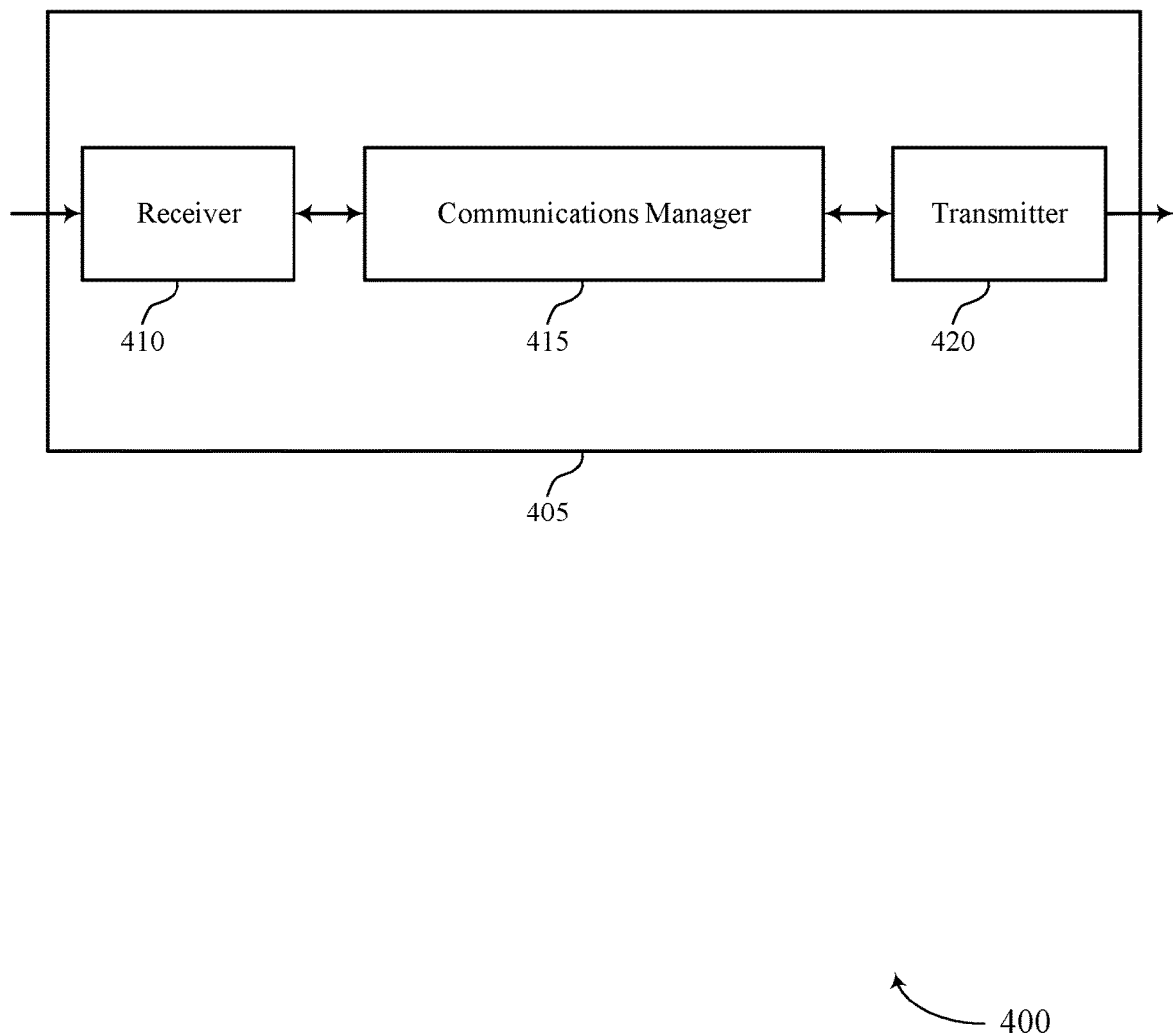
FIGS. 4 and 5 show block diagrams of devices that support early measurements for logged MDT in accordance with aspects of the present disclosure.

FIG. 4 shows a block diagram 400 of a device 405 that supports early measurements for logged MDT in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to early measurements for logged MDT, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive, from a base station, an idle mode measurement configuration and a logged measurement configuration for performing measurements while the UE is in an idle state or an inactive state, determine, from the idle mode measurement configuration, that the measurements are to be also used for MDT reporting, generate an MDT report based on the idle mode measurement configuration and the logged measurement configuration, and transmit, to the base station, the MDT report based on the idle mode measurement configuration and the logged measurement configuration. The communications manager 415 may be an example of aspects of the communications manager 710 described herein.

The communications manager 415 may receive, from a base station, an idle mode measurement configuration and a logged measurement configuration for performing measurements while the UE is in an idle state or an inactive state, determine, from the idle mode measurement configuration, that the measurements are to be also used for MDT reporting, generate one or more idle mode measurement reports based on the idle mode measurement configuration and a MDT report based on the idle mode measurement configuration and the logged measurement configuration, and transmit, to the base station, the one or more idle mode measurement reports based on the idle mode measurement configuration and the MDT report based on the idle mode measurement configuration and the logged measurement configuration. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

The communications manager 415 of a UE 115 may operate the components described herein to improve the efficiency of MDT measurements, including using idle mode measurements for logged MDT, which may improve overall network efficiency and save power and increase battery life of the UE 115.

Figure 5:
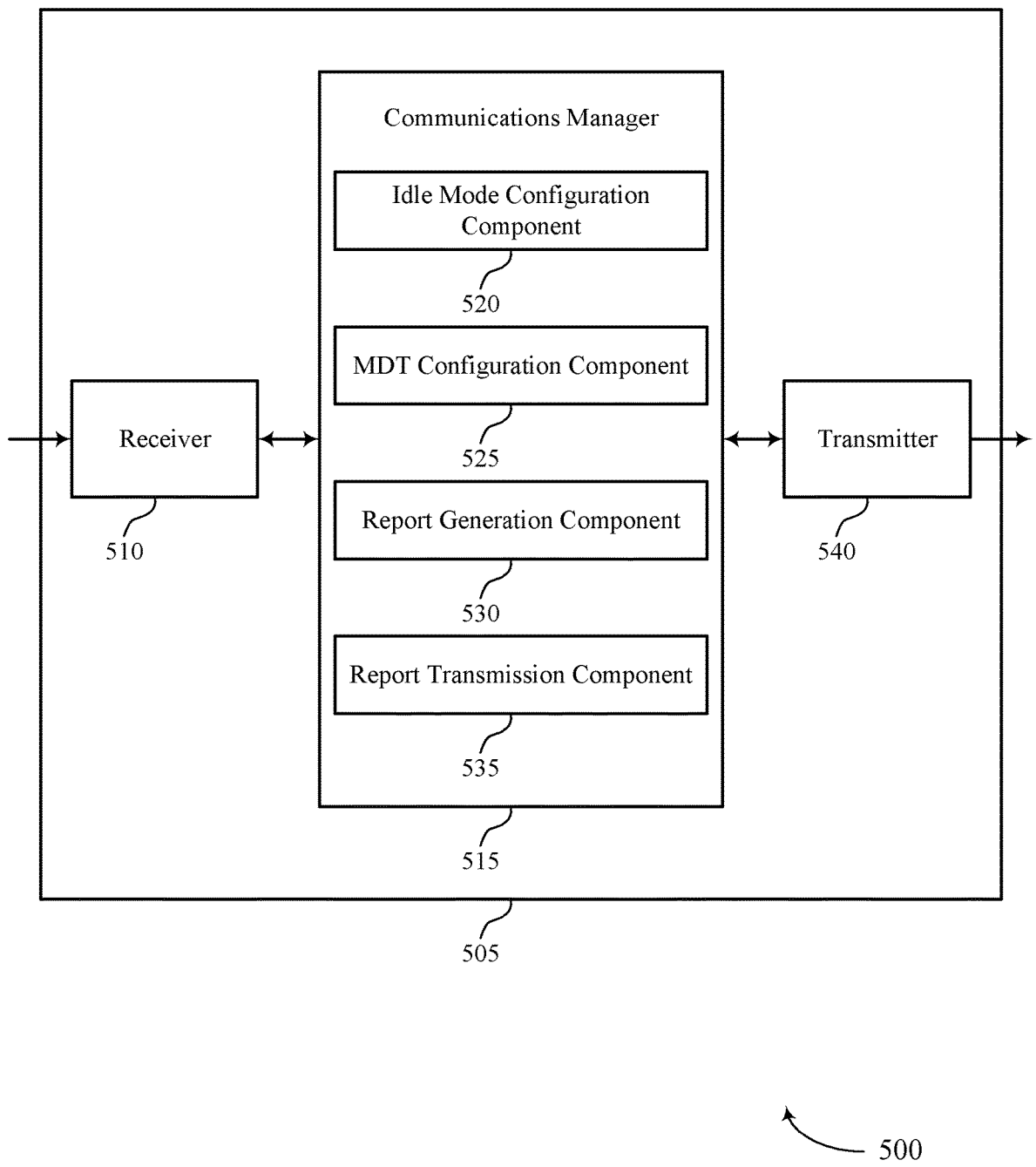

FIG. 5 shows a block diagram 500 of a device 505 that supports early measurements for logged MDT in accordance with aspects of the present disclosure. The device 505 may be an example of aspects of a device 405, or a UE 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to early measurements for logged MDT, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include an idle mode configuration component 520, an MDT configuration component 525, a report generation component 530, and a report transmission component 535. The communications manager 515 may be an example of aspects of the communications manager 710 described herein.

The idle mode configuration component 520 may receive, from a base station, an idle mode measurement configuration and a logged measurement configuration for performing measurements while the UE is in an idle state or an inactive state.

The MDT configuration component 525 may determine, from the idle mode measurement configuration, that the measurements are to be also used for MDT reporting.

The report generation component 530 may generate one or more idle mode measurement reports based on the idle mode measurement configuration and a MDT report based on the idle mode measurement configuration and the logged measurement configuration.

The report transmission component 535 may transmit, to the base station, the one or more idle mode measurement reports based on the idle mode measurement configuration and the MDT report based on the idle mode measurement configuration and the logged measurement configuration.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

A processor of a UE 115, operating the transmitter 540, the receiver 510, and the transceiver 720 as described with reference to FIG. 7, may operate the components described herein to improve the efficiency of MDT measurements, including using idle mode measurements for logged MDT, which may improve overall network efficiency and save power and increase battery life of the UE 115.

Figure 6:
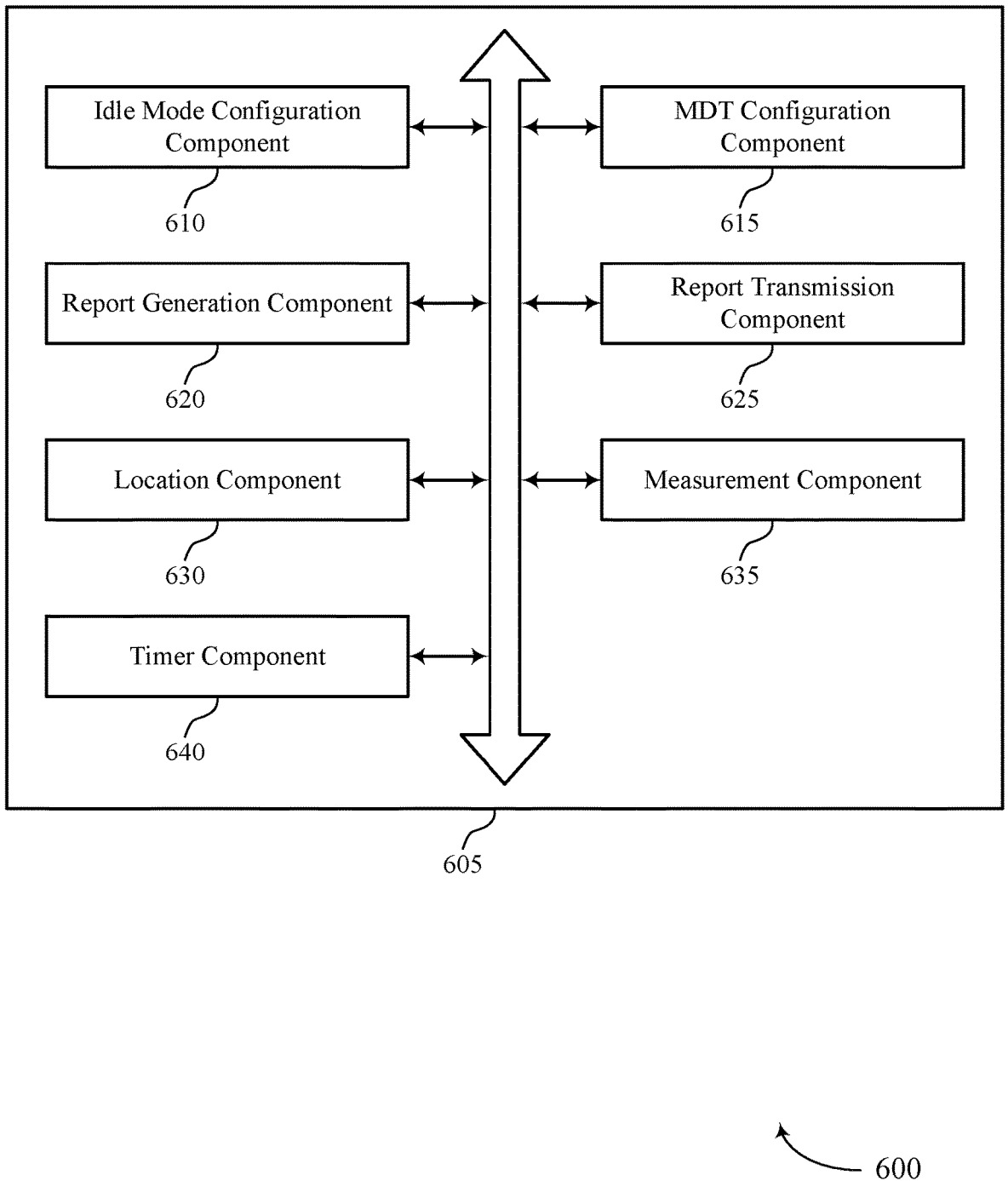
FIG. 6 shows a block diagram of a communications manager that supports early measurements for logged MDT in accordance with aspects of the present disclosure.

FIG. 6 shows a block diagram 600 of a communications manager 605 that supports early measurements for logged MDT in accordance with aspects of the present disclosure. The communications manager 605 may be an example of aspects of a communications manager 415, a communications manager 515, or a communications manager 710 described herein. The communications manager 605 may include an idle mode configuration component 610, an MDT configuration component 615, a report generation component 620, a report transmission component 625, a location component 630, a measurement component 635, and a timer component 640. Each of these modules may communicate, directly or indirectly, with one another (e.g., via one or more buses).

The idle mode configuration component 610 may receive, from a base station, an idle mode measurement configuration and a logged measurement configuration for performing measurements while the UE is in an idle state or an inactive state.

In some examples, the idle mode configuration component 610 may receive the idle mode measurement configuration as part of a SIB transmission from the base station.

In some examples, the idle mode configuration component 610 may receive the idle mode measurement configuration as part of a RRC release message transmitted from the base station.

In some examples, the idle mode configuration component 610 may receive both a SIB transmission from the base station and a RRC release message transmitted from the base station, each of the SIB transmission and the RRC release message including respective idle mode measurement configurations.

In some examples, the idle mode configuration component 610 may identify the idle mode measurement configuration from the RRC release message based on both the SIB transmission and the RRC release message including respective idle mode measurement configurations.

In some examples, the idle mode configuration component 610 may receive, from the base station, an indication that the UE is to transmit multiple idle mode measurement reports to the base station.

In some examples, the idle mode configuration component 610 may transmit, to the base station, at least a set of the one or more idle mode measurement reports based on receipt of the indication, each of the set of the one or more idle mode measurement reports being associated with a timestamp or a cell identifier.

In some examples, the idle mode configuration component 610 may receive a logged measurement configuration that includes at least one of frequency or cell information included in the idle mode measurement configuration, where the measurements are based on the logged measurement configuration and the idle mode measurement configuration.

In some examples, the idle mode configuration component 610 may receive a SIB transmission from the base station including an updated idle mode measurement configuration.

In some examples, the idle mode configuration component 610 may overwrite the idle mode measurement configuration based on the updated idle mode measurement configuration.

In some examples, the idle mode configuration component 610 may receive a SIB transmission from the base station including an updated idle mode measurement configuration.

The MDT configuration component 615 may determine, from the idle mode measurement configuration, that the measurements are to be also used for MDT reporting.

In some examples, the MDT configuration component 615 may identify that the idle mode measurement configuration includes a flag that is indicative that the idle mode measurement configuration is to be also used for MDT reporting.

In some examples, the MDT configuration component 615 may receive a logged measurement configuration that indicates that the UE is to use the idle mode measurement configuration for obtaining the measurements to be used for MDT reporting and the generation of the MDT report.

The report generation component 620 may generate one or more idle mode measurement reports based on the idle mode measurement configuration and a MDT report based on the idle mode measurement configuration and the logged measurement configuration.

In some examples, the report generation component 620 may receive a request for the MDT report.

In some examples, generating the MDT report, where the MDT report includes the measurement of the one or more neighbor RATs, the one or more neighbor frequencies, or a combination thereof, based on determining, from the idle mode measurement configuration, that the measurements are to be used for MDT reporting.

In some examples, the report generation component 620 may receive a request of the MDT report.

The report transmission component 625 may transmit, to the base station, the one or more idle mode measurement reports based on the idle mode measurement configuration and the MDT report based on the idle mode measurement configuration and the logged measurement configuration.

In some examples, the report transmission component 625 may transmit, to the base station, a most recently generated idle mode measurement report from the one or more idle mode measurement reports.

In some examples, the report transmission component 625 may transmit, to the base station, an indication that additional ones of the one or more idle mode measurement reports are available for transmission to the base station.

In some examples, the report transmission component 625 may transmit the MDT report.

In some examples, the report transmission component 625 may transmit the MDT report including the measurement of the RAT of the UE, the measurement of the frequency of the UE, or both.

In some examples, the report transmission component 625 may transmit the MDT report including the measurement of the one or more neighbor RATs, the measurement of the one or more neighbor frequencies, or a combination thereof, and the measurement of the RAT of the UE, the measurement of the frequency of the UE, or both.

In some examples, the report transmission component 625 may transmit the MDT report including the measurement of the RAT of the UE, the frequency of the UE, or both.

The location component 630 may identify that the idle mode measurement configuration includes location information.

In some examples, the location component 630 may determine that the idle mode measurement configuration is to be used for MDT reporting based on the idle mode measurement configuration including the location information.

In some examples, the location component 630 may include location information in the one or more idle mode measurement reports.

The measurement component 635 may identify one or more neighbor RATs, one or more neighbor frequencies, or combination thereof.

In some examples, the measurement component 635 may measure one or more of the neighbor RATs, one or more of the neighbor frequencies, or a combination thereof.

In some examples, the measurement component 635 may measure a RAT of the UE, a frequency of the UE, or both.

In some examples, the measurement component 635 may refrain from measuring the one or more neighbor RATs, the one or more neighbor frequencies, or the combination thereof, where the one or more neighbor RATs, the one or more neighbor frequencies, or the combination thereof are based on the idle mode measurement configuration.

In some examples, the measurement component 635 may initiate measurement of one or more of the neighbor RATs, one or more of the neighbor frequencies, or a combination thereof, where the one or more of the neighbor RATs, one or more of the neighbor frequencies, or the combination thereof are based on the updated idle mode measurement configuration.

In some examples, the measurement component 635 may refrain from measuring the one or more neighbor RATs, the one or more neighbor frequencies, or a combination thereof, where the one or more neighbor RATs, the one or more neighbor frequencies, or the combination thereof are based on the updated idle mode measurement configuration.

In some examples, the measurement component 635 may measure the RAT of the UE, the frequency of the UE, or both, based on determining that a MDT timer is not running.

In some examples, the measurement component 635 may identify one or more neighbor RATs, neighbor frequencies, or combination thereof.

In some examples, the measurement component 635 may refrain from measuring the one or more neighbor RATs, the one or more neighbor frequencies, or a combination thereof.

In some examples, the measurement component 635 may initiate measurement of a RAT of the UE, a frequency of the UE, or both, based on determining that the MDT timer is running and based on receiving the SIB transmission including the updated idle mode measurement configuration.

The timer component 640 may identify that a MDT timer is running.

In some cases, the refraining from measuring is based on identifying that a MDT timer is not running.

Figure 7:
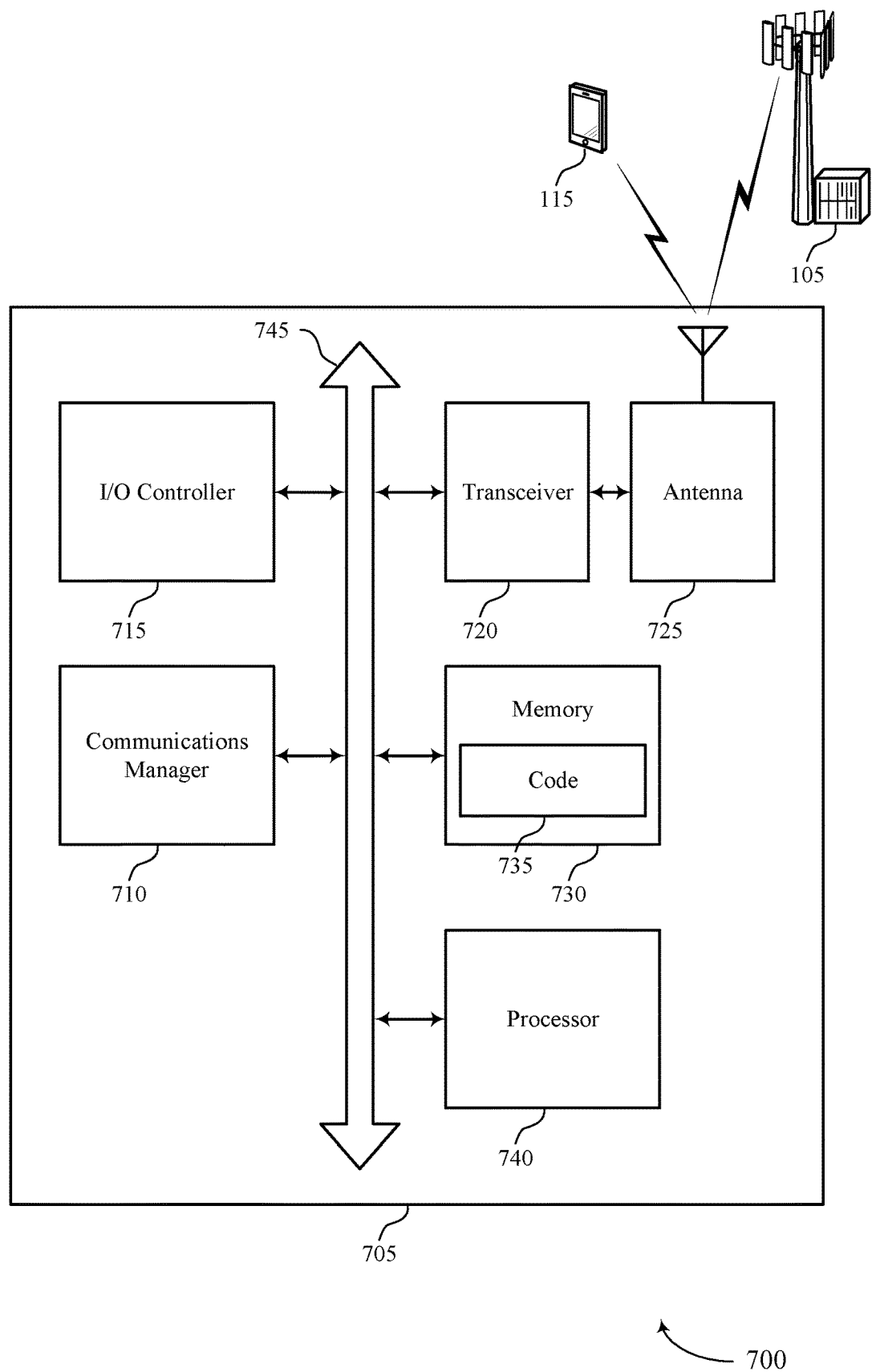
FIG. 7 shows a diagram of a system including a device that supports early measurements for logged MDT in accordance with aspects of the present disclosure.

FIG. 7 shows a diagram of a system 700 including a device 705 that supports early measurements for logged MDT in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive, from a base station, an idle mode measurement configuration and a logged measurement configuration for performing measurements while the UE is in an idle state or an inactive state, determine, from the idle mode measurement configuration, that the measurements are to be also used for MDT reporting, generate one or more idle mode measurement reports based on the idle mode measurement configuration and a MDT report based on the idle mode measurement configuration and the logged measurement configuration, and transmit, to the base station, the one or more idle mode measurement reports based on the idle mode measurement configuration and the MDT report based on the idle mode measurement configuration and the logged measurement configuration.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting early measurements for logged MDT).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
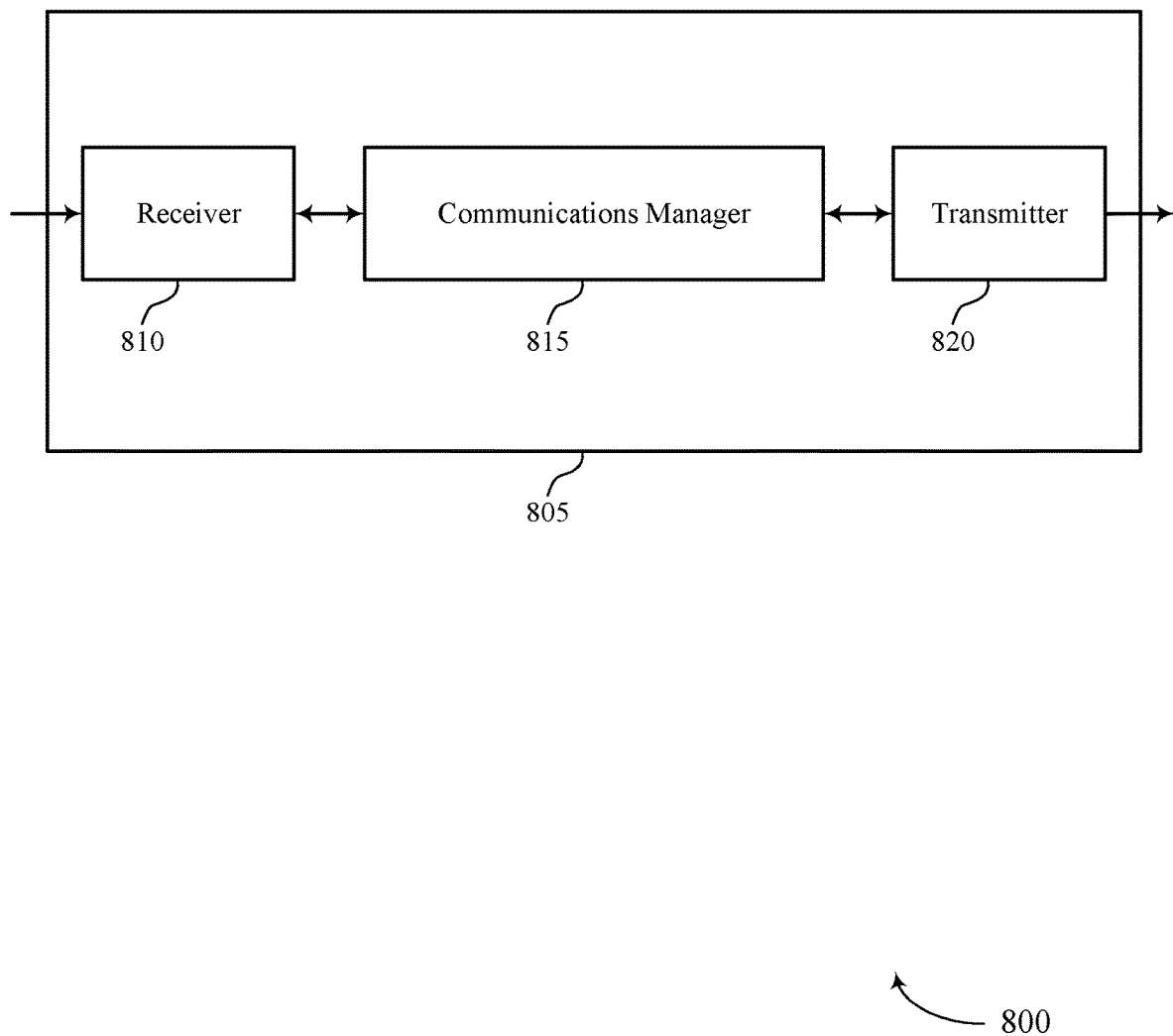
FIGS. 8 and 9 show block diagrams of devices that support early measurements for logged MDT in accordance with aspects of the present disclosure.

FIG. 8 shows a block diagram 800 of a device 805 that supports early measurements for logged MDT in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to early measurements for logged MDT, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify an idle mode measurement configuration for a UE to perform measurements in an idle state or an inactive state of the UE, transmit, to the UE, the idle mode measurement configuration for the UE to perform measurements while in the idle mode, and receive, from the UE, one or more idle mode measurement reports based on the idle mode measurement configuration and a MDT report based on the idle mode measurement configuration and a logged measurement configuration. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
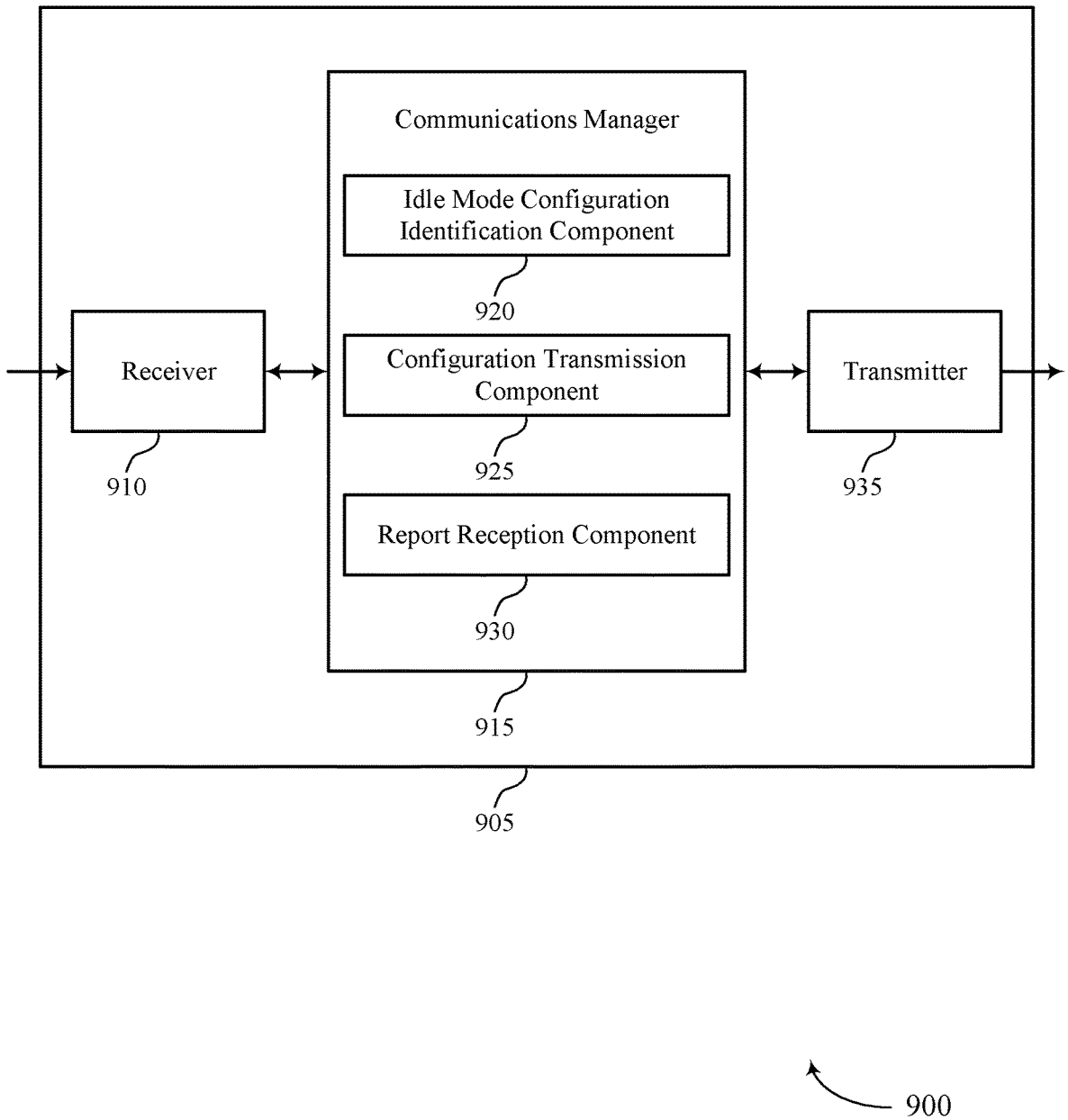

FIG. 9 shows a block diagram 900 of a device 905 that supports early measurements for logged MDT in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to early measurements for logged MDT, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an idle mode configuration identification component 920, a configuration transmission component 925, and a report reception component 930. The communications manager 915 may be an example of aspects of the communications manager 1110 described herein.

The idle mode configuration identification component 920 may identify an idle mode measurement configuration for a UE to perform measurements in an idle state or an inactive state of the UE.

The configuration transmission component 925 may transmit, to the UE, the idle mode measurement configuration for the UE to perform measurements while in the idle mode.

The report reception component 930 may receive, from the UE, one or more idle mode measurement reports based on the idle mode measurement configuration and a MDT report based on the idle mode measurement configuration and a logged measurement configuration.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
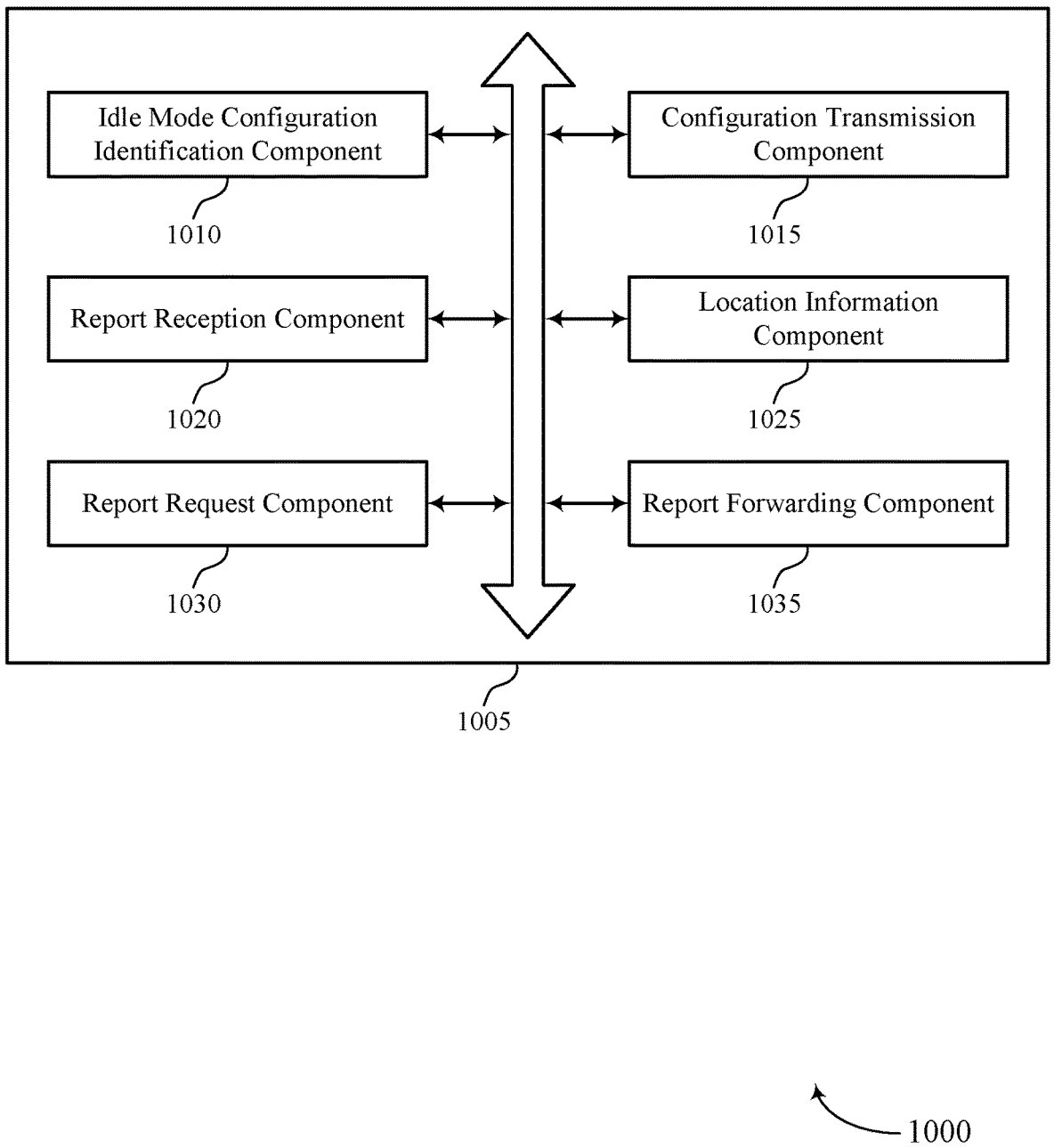
FIG. 10 shows a block diagram of a communications manager that supports early measurements for logged MDT in accordance with aspects of the present disclosure.

FIG. 10 shows a block diagram 1000 of a communications manager 1005 that supports early measurements for logged MDT in accordance with aspects of the present disclosure. The communications manager 1005 may be an example of aspects of a communications manager 815, a communications manager 915, or a communications manager 1110 described herein. The communications manager 1005 may include an idle mode configuration identification component 1010, a configuration transmission component 1015, a report reception component 1020, a location information component 1025, a report request component 1030, and a report forwarding component 1035. Each of these modules may communicate, directly or indirectly, with one another (e.g., via one or more buses).

The idle mode configuration identification component 1010 may identify an idle mode measurement configuration for a UE to perform measurements in an idle state or an inactive state of the UE.

In some examples, the idle mode configuration identification component 1010 may identify that the UE transmitted the one or more idle mode measurement reports to perform downlink clear channel assessment.

In some cases, the one or more idle mode measurement reports includes location information.

The configuration transmission component 1015 may transmit, to the UE, the idle mode measurement configuration for the UE to perform measurements while in the idle mode.

In some examples, the configuration transmission component 1015 may transmit the idle mode measurement configuration as part of a SIB transmission to the UE.

In some examples, the configuration transmission component 1015 may transmit the idle mode measurement configuration as part of a RRC release message transmitted to the UE.

In some examples, the configuration transmission component 1015 may transmit, to the UE, an indication that the UE is to transmit multiple idle mode measurement reports to the base station.

In some examples, the configuration transmission component 1015 may transmit a logged measurement configuration that indicates that the UE is to use the idle mode measurement configuration for obtaining the measurements to be used for MDT reporting and generation of the one or more idle mode measurement reports.

In some examples, the configuration transmission component 1015 may transmit a logged MDT configuration that includes at least one of frequency or cell information included in the idle mode measurement configuration, where the measurements are based on the logged MDT configuration, which is based on the idle mode measurement configuration.

In some examples, the configuration transmission component 1015 may transmit a SIB transmission from the base station including an updated idle mode measurement configuration.

In some examples, the configuration transmission component 1015 may receive an indication of the MDT report configuration from an OAM network device.

In some cases, the OAM network device relays the MDT report configuration to the base station through an access and mobility management function.

The report reception component 1020 may receive, from the UE, one or more idle mode measurement reports based on the idle mode measurement configuration and a MDT report based on the idle mode measurement configuration and a logged measurement configuration.

In some examples, the report reception component 1020 may receive, from the UE, a most recently generated idle mode measurement report from the one or more idle mode measurement reports.

In some examples, the report reception component 1020 may receive, from the UE, an indication that additional ones of the one or more idle mode measurement reports are available for transmission to the base station.

In some examples, the report reception component 1020 may receive, from the UE, at least a set of the one or more idle mode measurement reports based on receipt of the indication, each of the set of the one or more idle mode measurement reports being associated with a timestamp or a cell identifier.

In some examples, the report reception component 1020 may receive the MDT report including a measurement of one or more of neighbor RATs of the UE, a measurement of the one or more of neighbor frequencies of the UE, or a combination thereof.

In some examples, the report reception component 1020 may receive the MDT report including the measurement of a RAT of the UE, the measurement of a frequency of the UE, or both.

In some examples, the report reception component 1020 may receive the one or more idle mode measurement reports and the MDT report including a measurement of one or more neighbor RATs of the UE, a measurement of the one or more neighbor frequencies of the UE, or a combination thereof, and a measurement of a RAT of the UE, a measurement of a frequency of the UE, or both.

The location information component 1025 may ignore the location information based on the identifying.

The report request component 1030 may transmit a request for the MDT report.

The report forwarding component 1035 may transmit the idle mode measurement report to a trace collection entity, where the idle mode measurement report is for MDT reporting.

In some examples, the report forwarding component 1035 may transmit the one or more idle mode measurement reports and the idle mode measurement report to a trace collection entity.

In some examples, the report forwarding component 1035 may transmit, with the one or more idle mode measurement reports, an indication that the one or more idle mode measurement reports are associated with the idle mode measurement configuration.

In some cases, the idle mode measurement report includes a flag indicating that measurements of the idle mode measurement report are collected using the idle mode measurement configuration.

Figure 11:
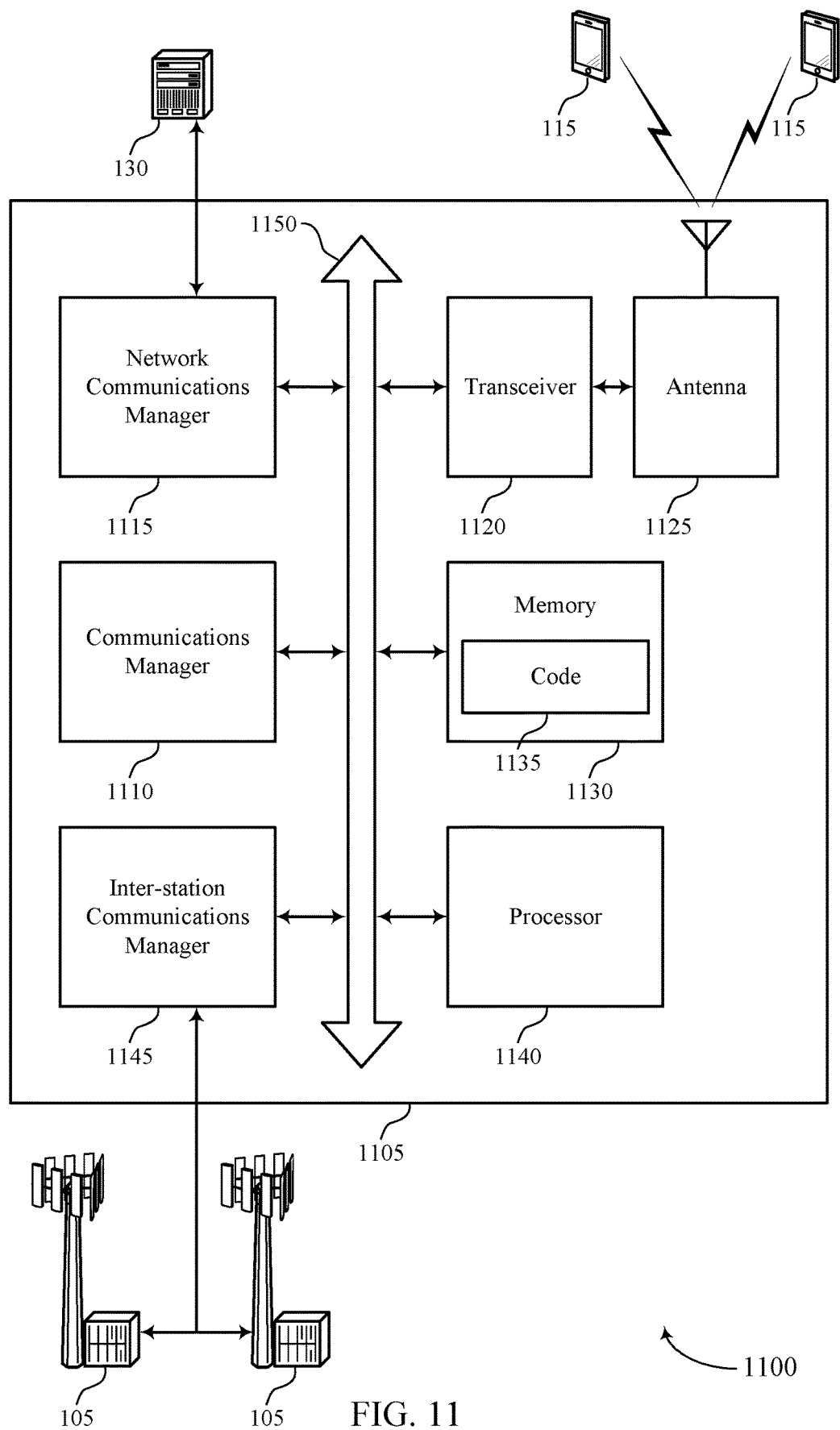
FIG. 11 shows a diagram of a system including a device that supports early measurements for logged MDT in accordance with aspects of the present disclosure.

FIG. 11 shows a diagram of a system 1100 including a device 1105 that supports early measurements for logged MDT in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify an idle mode measurement configuration for a UE to perform measurements in an idle state or an inactive state of the UE, transmit, to the UE, the idle mode measurement configuration for the UE to perform measurements while in the idle mode, and receive, from the UE, one or more idle mode measurement reports based on the idle mode measurement configuration and a MDT report based on the idle mode measurement configuration and a logged measurement configuration.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting early measurements for logged MDT).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
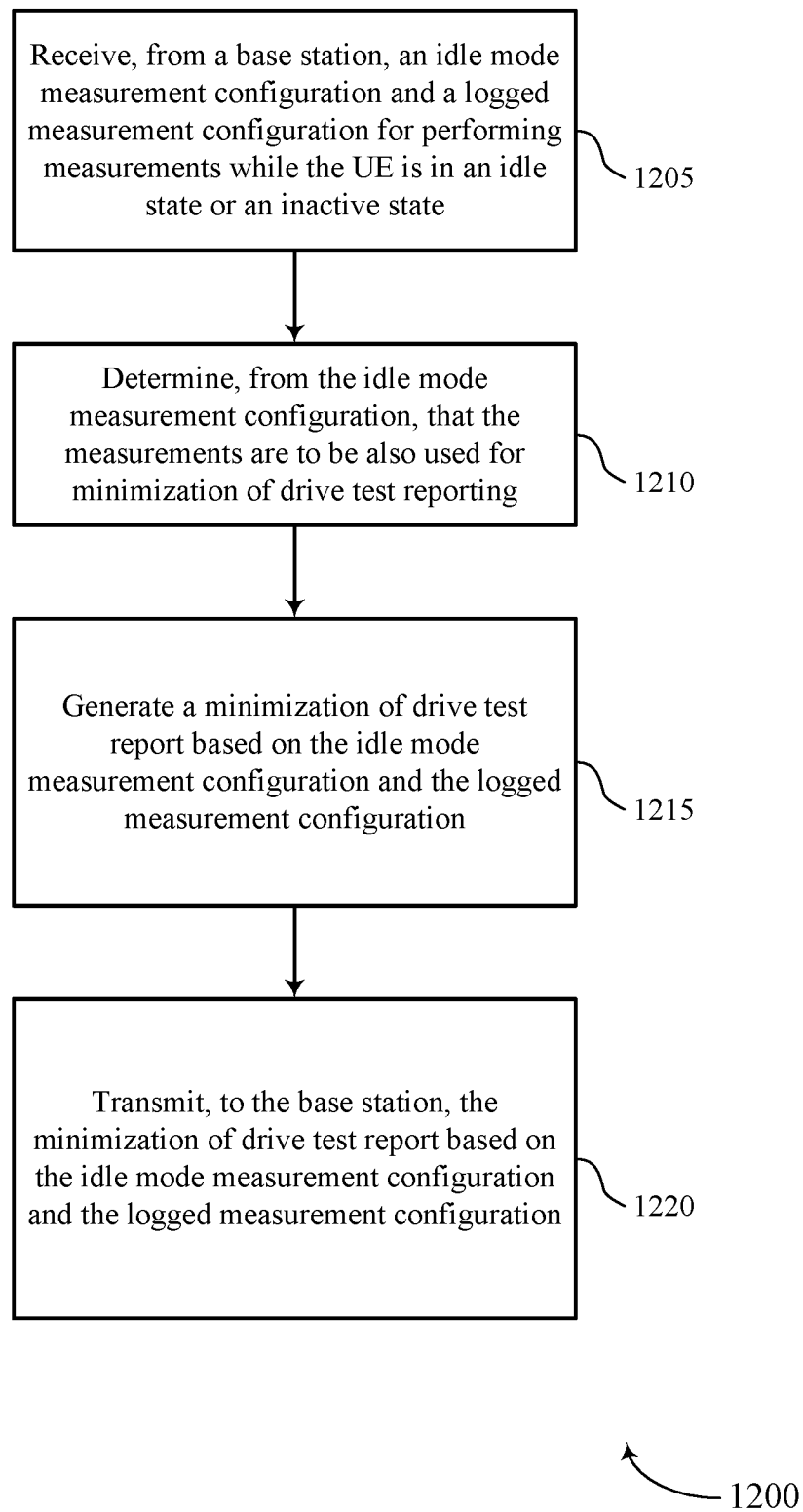
FIGS. 12 through 16 show flowcharts illustrating methods that support early measurements for logged MDT in accordance with aspects of the present disclosure.

FIG. 12 shows a flowchart illustrating a method 1200 that supports early measurements for logged MDT in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may receive, from a base station, an idle mode measurement configuration and a logged measurement configuration for performing measurements while the UE is in an idle state or an inactive state. The operations of 1205 may be performed according to the methods described herein. In some examples, aspects of the operations of 1205 may be performed by an idle mode configuration component as described with reference to FIGS. 4 through 7.

At 1210, the UE may determine, from the idle mode measurement configuration, that the measurements are to be also used for MDT reporting. The operations of 1210 may be performed according to the methods described herein. In some examples, aspects of the operations of 1210 may be performed by an MDT configuration component as described with reference to FIGS. 4 through 7.

At 1215, the UE may generate an MDT report based on the idle mode measurement configuration and the logged measurement configuration. The operations of 1215 may be performed according to the methods described herein. In some examples, aspects of the operations of 1215 may be performed by a report generation component as described with reference to FIGS. 4 through 7.

At 1220, the UE may transmit, to the base station, the MDT report based on the idle mode measurement configuration and the logged measurement configuration. The operations of 1220 may be performed according to the methods described herein. In some examples, aspects of the operations of 1220 may be performed by a report transmission component as described with reference to FIGS. 4 through 7.

Figure 13:
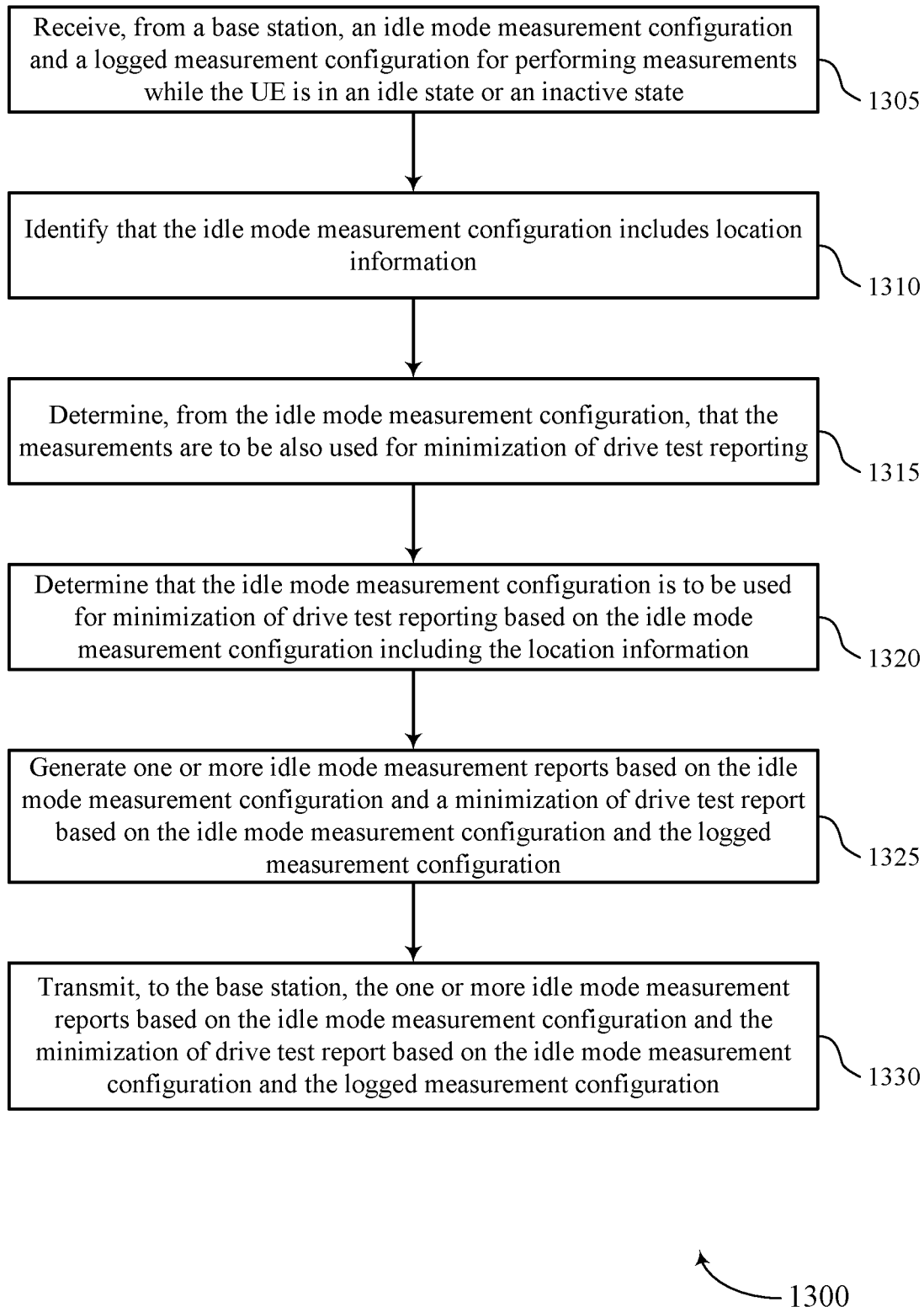

FIG. 13 shows a flowchart illustrating a method 1300 that supports early measurements for logged MDT in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, an idle mode measurement configuration and a logged measurement configuration for performing measurements while the UE is in an idle state or an inactive state. The operations of 1305 may be performed according to the methods described herein. In some examples, aspects of the operations of 1305 may be performed by an idle mode configuration component as described with reference to FIGS. 4 through 7.

At 1310, the UE may identify that the idle mode measurement configuration includes location information. The operations of 1310 may be performed according to the methods described herein. In some examples, aspects of the operations of 1310 may be performed by a location component as described with reference to FIGS. 4 through 7.

At 1315, the UE may determine, from the idle mode measurement configuration, that the measurements are to be also used for MDT reporting. The operations of 1315 may be performed according to the methods described herein. In some examples, aspects of the operations of 1315 may be performed by an MDT configuration component as described with reference to FIGS. 4 through 7.

At 1320, the UE may determine that the idle mode measurement configuration is to be used for MDT reporting based on the idle mode measurement configuration including the location information. The operations of 1320 may be performed according to the methods described herein. In some examples, aspects of the operations of 1320 may be performed by a location component as described with reference to FIGS. 4 through 7.

At 1325, the UE may generate one or more idle mode measurement reports based on the idle mode measurement configuration and a MDT report based on the idle mode measurement configuration and the logged measurement configuration. The operations of 1325 may be performed according to the methods described herein. In some examples, aspects of the operations of 1325 may be performed by a report generation component as described with reference to FIGS. 4 through 7.

At 1330, the UE may transmit, to the base station, the one or more idle mode measurement reports based on the idle mode measurement configuration and the MDT report based on the idle mode measurement configuration and the logged measurement configuration. The operations of 1330 may be performed according to the methods described herein. In some examples, aspects of the operations of 1330 may be performed by a report transmission component as described with reference to FIGS. 4 through 7.

Figure 14:
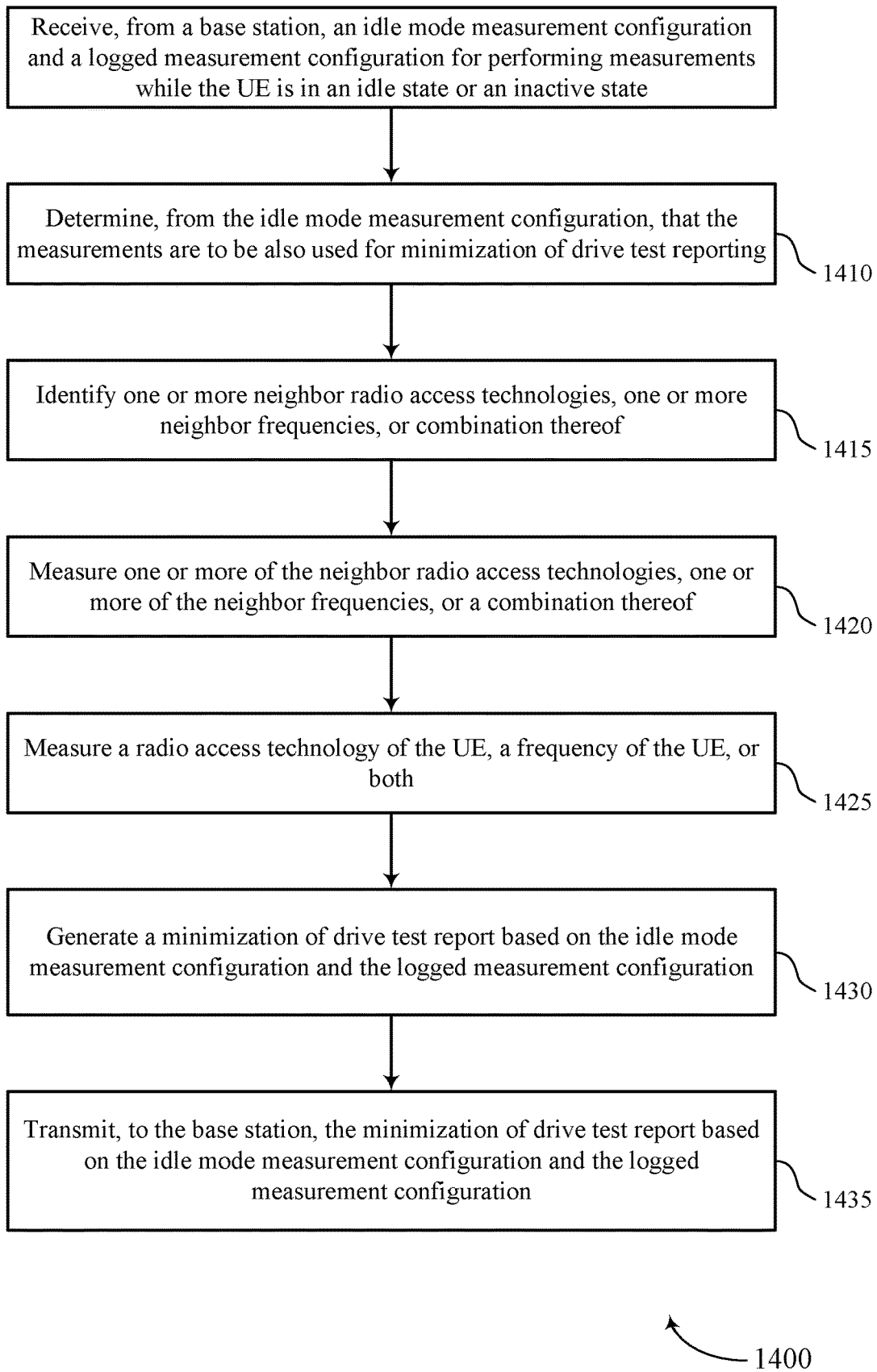

FIG. 14 shows a flowchart illustrating a method 1400 that supports early measurements for logged MDT in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, an idle mode measurement configuration and a logged measurement configuration for performing measurements while the UE is in an idle state or an inactive state. The operations of 1405 may be performed according to the methods described herein. In some examples, aspects of the operations of 1405 may be performed by an idle mode configuration component as described with reference to FIGS. 4 through 7.

At 1410, the UE may determine, from the idle mode measurement configuration, that the measurements are to be also used for MDT reporting. The operations of 1410 may be performed according to the methods described herein. In some examples, aspects of the operations of 1410 may be performed by an MDT configuration component as described with reference to FIGS. 4 through 7.

At 1415, the UE may identify one or more neighbor RATs, one or more neighbor frequencies, or combination thereof. The operations of 1415 may be performed according to the methods described herein. In some examples, aspects of the operations of 1415 may be performed by a measurement component as described with reference to FIGS. 4 through 7.

At 1420, the UE may measure one or more of the neighbor RATs, one or more of the neighbor frequencies, or a combination thereof. The operations of 1420 may be performed according to the methods described herein. In some examples, aspects of the operations of 1420 may be performed by a measurement component as described with reference to FIGS. 4 through 7.

At 1425, the UE may measure a RAT of the UE, a frequency of the UE, or both. The operations of 1425 may be performed according to the methods described herein. In some examples, aspects of the operations of 1425 may be performed by a measurement component as described with reference to FIGS. 4 through 7.

At 1430, the UE may generate an MDT report based on the idle mode measurement configuration and the logged measurement configuration. The operations of 1430 may be performed according to the methods described herein. In some examples, aspects of the operations of 1430 may be performed by a report generation component as described with reference to FIGS. 4 through 7.

At 1435, the UE may transmit, to the base station the MDT report based on the idle mode measurement configuration and the logged measurement configuration. The operations of 1435 may be performed according to the methods described herein. In some examples, aspects of the operations of 1435 may be performed by a report transmission component as described with reference to FIGS. 4 through 7.

Figure 15:
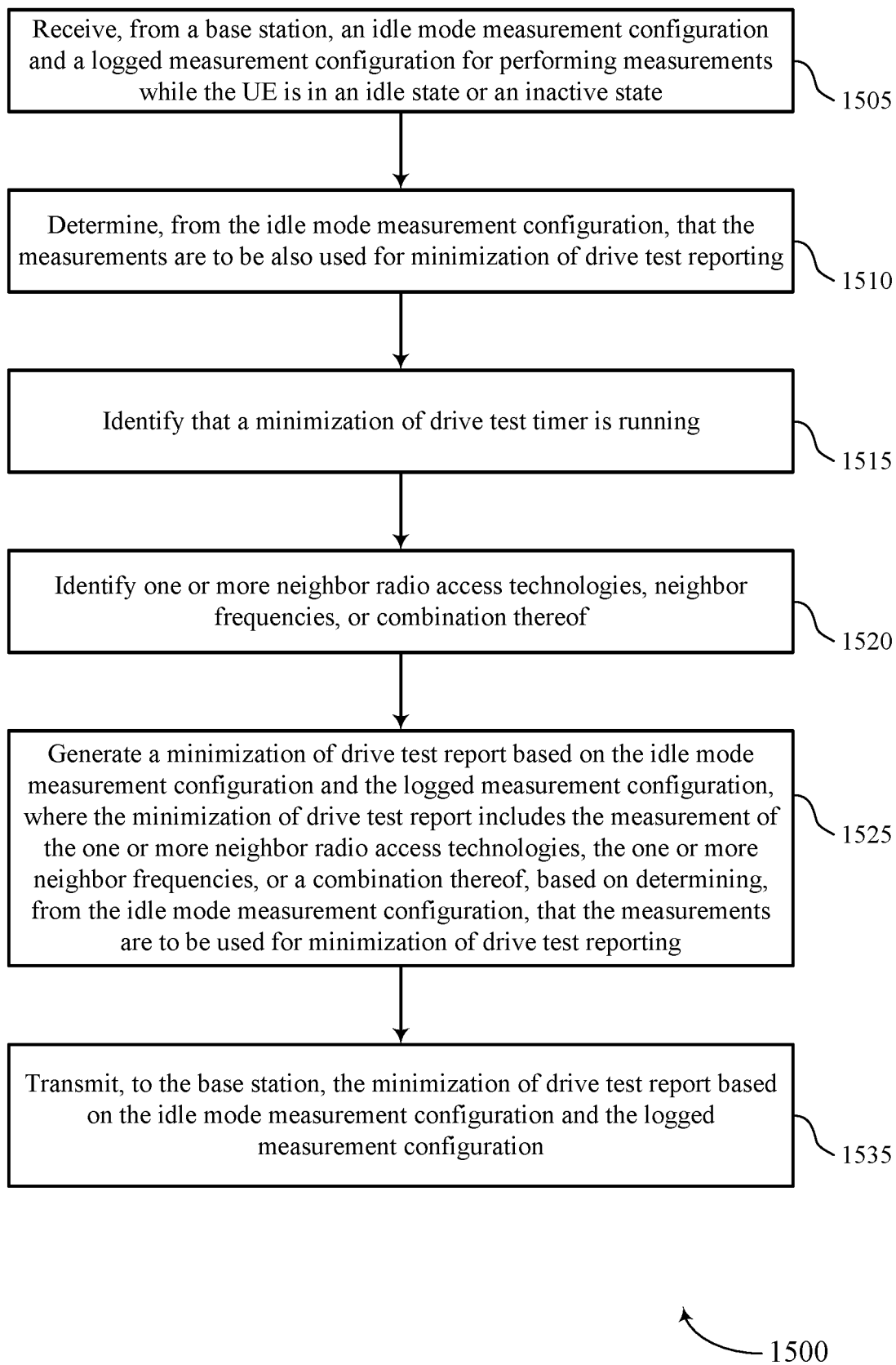

FIG. 15 shows a flowchart illustrating a method 1500 that supports early measurements for logged MDT in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, an idle mode measurement configuration and a logged measurement configuration for performing measurements while the UE is in an idle state or an inactive state. The operations of 1505 may be performed according to the methods described herein. In some examples, aspects of the operations of 1505 may be performed by an idle mode configuration component as described with reference to FIGS. 4 through 7.

At 1510, the UE may determine, from the idle mode measurement configuration, that the measurements are to be also used for MDT reporting. The operations of 1510 may be performed according to the methods described herein. In some examples, aspects of the operations of 1510 may be performed by an MDT configuration component as described with reference to FIGS. 4 through 7.

At 1515, the UE may identify that a MDT timer is running. The operations of 1515 may be performed according to the methods described herein. In some examples, aspects of the operations of 1515 may be performed by a timer component as described with reference to FIGS. 4 through 7.

At 1520, the UE may identify one or more neighbor RATs, neighbor frequencies, or combination thereof. The operations of 1520 may be performed according to the methods described herein. In some examples, aspects of the operations of 1520 may be performed by a measurement component as described with reference to FIGS. 4 through 7.

At 1525, the UE may generate an MDT report based on the idle mode measurement configuration and the logged measurement configuration, where the MDT report includes the measurement of the one or more neighbor RATs, the one or more neighbor frequencies, or a combination thereof, based on determining, from the idle mode measurement configuration, that the measurements are to be used for MDT reporting. The operations of 1525 may be performed according to the methods described herein. In some examples, aspects of the operations of 1525 may be performed by a report generation component as described with reference to FIGS. 4 through 7.

At 1535, the UE may transmit, to the base station, the MDT report based on the idle mode measurement configuration and the logged measurement configuration. The operations of 1535 may be performed according to the methods described herein. In some examples, aspects of the operations of 1535 may be performed by a report transmission component as described with reference to FIGS. 4 through 7.

Figure 16:
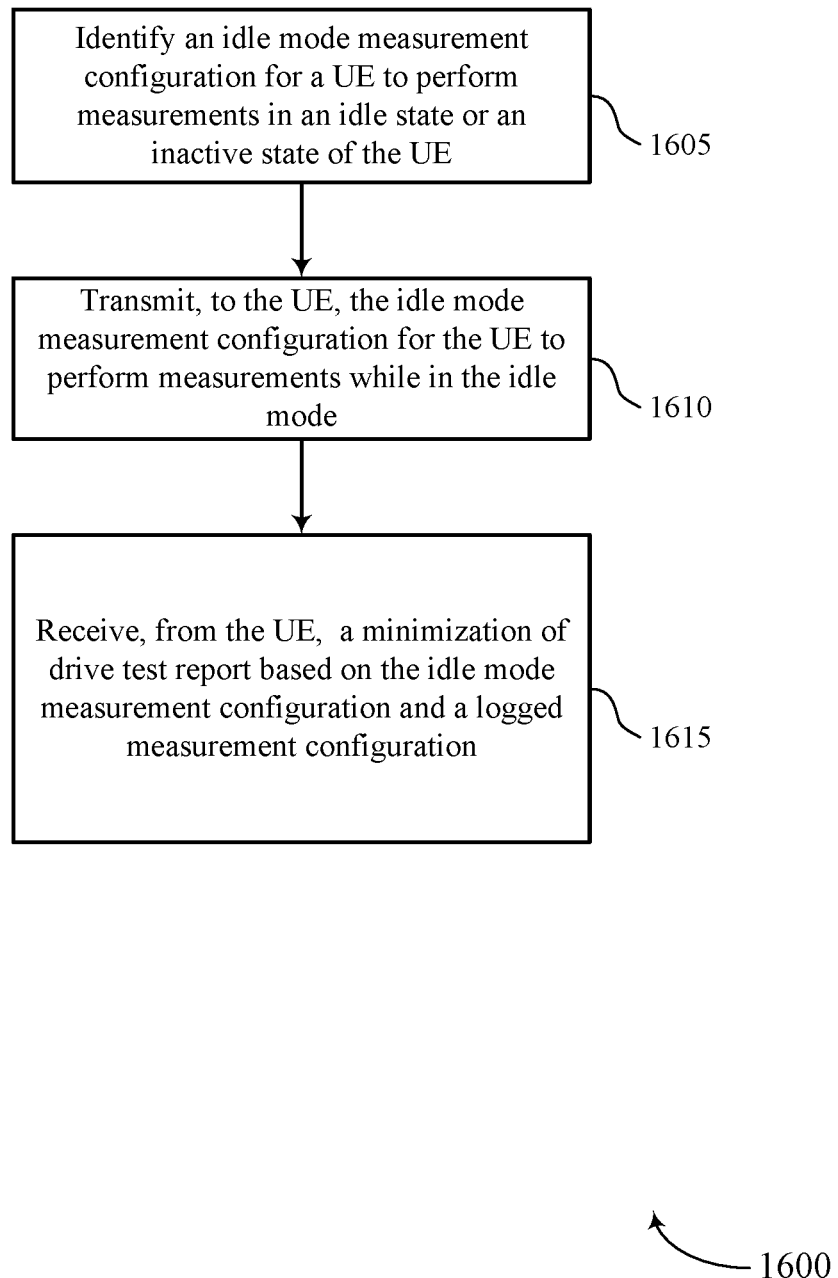

FIG. 16 shows a flowchart illustrating a method 1600 that supports early measurements for logged MDT in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1605, the base station may identify an idle mode measurement configuration for a UE to perform measurements in an idle state or an inactive state of the UE. The operations of 1605 may be performed according to the methods described herein. In some examples, aspects of the operations of 1605 may be performed by an idle mode configuration identification component as described with reference to FIGS. 8 through 11.

At 1610, the base station may transmit, to the UE, the idle mode measurement configuration for the UE to perform measurements while in the idle mode. The operations of 1610 may be performed according to the methods described herein. In some examples, aspects of the operations of 1610 may be performed by a configuration transmission component as described with reference to FIGS. 8 through 11.

At 1615, the base station may receive, from the UE, an MDT report based on the idle mode measurement configuration and a logged measurement configuration. The operations of 1615 may be performed according to the methods described herein. In some examples, aspects of the operations of 1615 may be performed by a report reception component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving, from a base station, an idle mode measurement configuration and a logged measurement configuration for performing measurements while the UE is in an idle state or an inactive state; determining, from the idle mode measurement configuration, that the measurements are to be also used for MDT reporting; generating an MDT report based at least in part on the idle mode measurement configuration and the logged measurement configuration; and transmitting, to the base station, the MDT report based at least in part on the idle mode measurement configuration and the logged measurement configuration.

Aspect 2: The method of aspect 1, wherein determining that the measurements are to be also used for MDT reporting comprises: identifying that the idle mode measurement configuration includes a flag that is indicative that the idle mode measurement configuration is to be also used for MDT reporting.

Aspect 3: The method of any of aspects 1 through 2, wherein determining that the measurements are to be used for MDT reporting comprises: receiving a logged measurement configuration that indicates that the UE is to use the idle mode measurement configuration for obtaining the measurements to be used for MDT reporting and the generation of the MDT report.

Aspect 4: The method of any of aspects 1 through 3, wherein determining that the measurements are to be used for MDT reporting comprises: receiving a logged measurement configuration that includes at least one of frequency or cell information included in the idle mode measurement configuration, wherein the measurements are based on the logged measurement configuration and the idle mode measurement configuration.

Aspect 5: The method of any of aspects 1 through 4, further comprising: identifying one or more neighbor RATs, one or more neighbor frequencies, or combination thereof; measuring one or more of the neighbor RATs, one or more of the neighbor frequencies, or a combination thereof; measuring a RAT of the UE, a frequency of the UE, or both; and transmitting the MDT report.

Aspect 6: The method of aspect 5, further comprising: receiving a SIB transmission from the base station comprising an updated idle mode measurement configuration; and overwriting the idle mode measurement configuration based at least in part on determining, from the updated idle mode measurement configuration, that the measurements are to be used for MDT reporting.

Aspect 7: The method of aspect 6, further comprising: refraining from measuring the one or more neighbor RATs, the one or more neighbor frequencies, or the combination thereof, wherein the one or more neighbor RATs, the one or more neighbor frequencies, or the combination thereof are based at least in part on the idle mode measurement configuration; and initiating measurement of one or more of the neighbor RATs, one or more of the neighbor frequencies, or a combination thereof, wherein the one or more of the neighbor RATs, one or more of the neighbor frequencies, or the combination thereof are based at least in part on the updated idle mode measurement configuration.

Aspect 8: The method of aspect 7, wherein the refraining from measuring is based at least in part on identifying that an MDT timer is not running.

Aspect 9: The method of any of aspects 7 through 8, further comprising: refraining from measuring the one or more neighbor RATs, the one or more neighbor frequencies, or a combination thereof, wherein the one or more neighbor RATs, the one or more neighbor frequencies, or the combination thereof are based at least in part on the updated idle mode measurement configuration; measuring the RAT of the UE, the frequency of the UE, or both, based at least in part on determining that an MDT timer is not running; receiving a request for the MDT report; and transmitting the MDT report comprising the measurement of the RAT of the UE, the measurement of the frequency of the UE, or both.

Aspect 10: The method of any of aspects 5 through 9, further comprising: transmitting the MDT report comprising the measurement of the one or more neighbor RATs, the measurement of the one or more neighbor frequencies, or a combination thereof, and the measurement of the RAT of the UE, the measurement of the frequency of the UE, or both.

Aspect 11: The method of any of aspects 1 through 10, further comprising: identifying that an MDT timer is running; identifying one or more neighbor RATs, neighbor frequencies, or combination thereof; and generating the MDT report, wherein the MDT report comprises the measurement of the one or more neighbor RATs, the one or more neighbor frequencies, or a combination thereof, based at least in part on determining, from the idle mode measurement configuration, that the measurements are to be used for MDT reporting.

Aspect 12: The method of aspect 11, further comprising: receiving a SIB transmission from the base station comprising an updated idle mode measurement configuration; refraining from measuring the one or more neighbor RATs, the one or more neighbor frequencies, or a combination thereof; and initiating measurement of a RAT of the UE, a frequency of the UE, or both, based at least in part on determining that the MDT timer is running and based at least in part on receiving the SIB transmission comprising the updated idle mode measurement configuration.

Aspect 13: The method of aspect 12, further comprising: receiving a request of the MDT report; and transmitting the MDT report comprising the measurement of the RAT of the UE, the frequency of the UE, or both.

Aspect 14: A method for wireless communications at a base station, comprising: identifying an idle mode measurement configuration for a UE to perform measurements in an idle state or an inactive state of the UE; transmitting, to the UE, the idle mode measurement configuration for the UE to perform measurements while in the idle mode; and receiving, from the UE, an MDT report based at least in part on the idle mode measurement configuration and a logged measurement configuration.

Aspect 15: The method of aspect 14, further comprising: transmitting a logged measurement configuration that indicates that the UE is to use the idle mode measurement configuration for obtaining the measurements to be used for MDT reporting.

Aspect 16: The method of any of aspects 14 through 15, further comprising: transmitting a logged MDT configuration that includes at least one of frequency or cell information included in the idle mode measurement configuration, wherein the measurements are based on the logged MDT configuration, which is based on the idle mode measurement configuration.

Aspect 17: The method of any of aspects 14 through 16, further comprising: transmitting a SIB transmission from the base station comprising an updated idle mode measurement configuration.

Aspect 18: The method of aspect 17, further comprising: receiving the MDT report comprising a measurement of one or more of neighbor RATs of the UE, a measurement of the one or more of neighbor frequencies of the UE, or a combination thereof.

Aspect 19: The method of aspect 18, further comprising: transmitting a request for the MDT report; and receiving the MDT report comprising the measurement of a RAT of the UE, the measurement of a frequency of the UE, or both.

Aspect 20: The method of aspect 19, further comprising: transmitting the MDT report to a trace collection entity.

Aspect 21: The method of aspect 20, wherein the MDT report comprises a flag indicating that measurements of the MDT report are collected using the idle mode measurement configuration.

Aspect 22: The method of any of aspects 14 through 21, further comprising: receiving the MDT report comprising a measurement of one or more neighbor RATs of the UE, a measurement of the one or more neighbor frequencies of the UE, or a combination thereof, and a measurement of a RAT of the UE, a measurement of a frequency of the UE, or both.

Aspect 23: The method of any of aspects 14 through 22, wherein identifying the idle mode measurement configuration comprises: receiving an indication of the MDT report configuration from an operations, administration and, maintenance network device.

Aspect 24: The method of aspect 23, wherein the operations, administration, and maintenance network device relays the MDT report configuration to the base station through an access and mobility management function.

Aspect 25: An apparatus for wireless communications at a UE, comprising a processor; memory coupled with the processor; and instructions stored in the memory and executable by the processor to cause the apparatus to perform a method of any of aspects 1 through 13.

Aspect 26: An apparatus for wireless communications at a UE, comprising at least one means for performing a method of any of aspects 1 through 13.

Aspect 27: A non-transitory computer-readable medium storing code for wireless communications at a UE, the code comprising instructions executable by a processor to perform a method of any of aspects 1 through 13.

Aspect 28: An apparatus for wireless communications at a base station, comprising a processor; memory coupled with the processor; and instructions stored in the memory and executable by the processor to cause the apparatus to perform a method of any of aspects 14 through 24.

Aspect 29: An apparatus for wireless communications at a base station, comprising at least one means for performing a method of any of aspects 14 through 24.

Aspect 30: A non-transitory computer-readable medium storing code for wireless communications at a base station, the code comprising instructions executable by a processor to perform a method of any of aspects 14 through 24.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a network entity, an idle mode measurement configuration and a logged measurement configuration for performing measurements while the UE is in an idle state or an inactive state;
   generating a minimization of drive test report in accordance with the idle mode measurement configuration and the logged measurement configuration and based at least in part on the logged measurement configuration comprising an indication for the UE to use one or more frequencies identified by the idle mode measurement configuration for obtaining the measurements to be used for the minimization of drive test reporting and generation of the minimization of drive test report; and
   transmitting, to the network entity, the minimization of drive test report based at least in part on the idle mode measurement configuration and the logged measurement configuration.

2. The method of claim 1, wherein determining that the measurements are to be also used for the minimization of drive test reporting comprises:
   identifying that the idle mode measurement configuration includes a flag that is indicative that the idle mode measurement configuration is to be also used for the minimization of drive test reporting.

3. The method of claim 1, wherein determining that the measurements are to be used for the minimization of drive test reporting comprises:
   receiving the logged measurement configuration that includes at least one of frequency or cell information included in the idle mode measurement configuration, wherein the measurements are based on the logged measurement configuration and the idle mode measurement configuration.

4. The method of claim 1, further comprising:
   identifying one or more neighbor radio access technologies, one or more neighbor frequencies, or combination thereof;
   measuring at least one of the one or more neighbor radio access technologies, the one or more neighbor frequencies, or any combination thereof;
   measuring a radio access technology of the UE, a frequency of the UE, or both; and
   transmitting the minimization of drive test report.

5. The method of claim 4, further comprising:
   receiving a system information block transmission from the network entity comprising an updated idle mode measurement configuration; and
   overwriting the idle mode measurement configuration based at least in part on determining, from the updated idle mode measurement configuration, that the measurements are to be used for the minimization of drive test reporting.

6. The method of claim 4, further comprising:
transmitting the minimization of drive test report comprising the measurement of the one or more neighbor radio access technologies, the measurement of the one or more neighbor frequencies, or any combination thereof, and the measurement of the radio access technology of the UE, the measurement of the frequency of the UE, or both.

7. The method of claim 5, further comprising:
refraining from measuring the one or more neighbor radio access technologies, the one or more neighbor frequencies, or the combination thereof, wherein the one or more neighbor radio access technologies, the one or more neighbor frequencies, or the combination thereof are based at least in part on the idle mode measurement configuration; and
initiating measurement of one or more of the neighbor radio access technologies, one or more of the neighbor frequencies, or a combination thereof, wherein the one or more of the neighbor radio access technologies, one or more of the neighbor frequencies, or any combination thereof, are based at least in part on the updated idle mode measurement configuration.

8. The method of claim 7, wherein the refraining from measuring is based at least in part on identifying that a minimization of drive test timer is not running.

9. The method of claim 7, further comprising:
refraining from measuring the one or more neighbor radio access technologies, the one or more neighbor frequencies, or a combination thereof, wherein the one or more neighbor radio access technologies, the one or more neighbor frequencies, or the combination thereof are based at least in part on the updated idle mode measurement configuration;
measuring the radio access technology of the UE, the frequency of the UE, or both, based at least in part on determining that a minimization of drive test timer is not running;
receiving a request for the minimization of drive test report; and
transmitting the minimization of drive test report comprising the measurement of the radio access technology of the UE, the measurement of the frequency of the UE, or both.

10. The method of claim 1, further comprising:
identifying that a minimization of drive test timer is running;
identifying one or more neighbor radio access technologies, one or more neighbor frequencies, or any combination thereof; and
generating the minimization of drive test report, wherein the minimization of drive test report comprises the measurement of the one or more neighbor radio access technologies, the one or more neighbor frequencies, or a combination thereof, based at least in part on the UE being indicated to use the idle mode measurement configuration for obtaining the measurements are to be used for the minimization of drive test reporting.

11. The method of claim 10, further comprising:
receiving a system information block transmission from the network entity comprising an updated idle mode measurement configuration;
refraining from measuring the one or more neighbor radio access technologies, the one or more neighbor frequencies, or any combination thereof; and
initiating measurement of a radio access technology of the UE, a frequency of the UE, or both, based at least in part on determining that the minimization of drive test timer is running and based at least in part on receiving the system information block transmission comprising the updated idle mode measurement configuration.

12. The method of claim 11, further comprising:
receiving a request of the minimization of drive test report; and
transmitting the minimization of drive test report comprising the measurement of the radio access technology of the UE, the frequency of the UE, or both.

13. A method for wireless communications at a network entity, comprising:
identifying an idle mode measurement configuration for a user equipment (UE) to perform measurements in an idle state or an inactive state of the UE;
transmitting, to the UE, the idle mode measurement configuration for the UE to perform the measurements while in the idle state or the inactive state;
transmitting a logged measurement configuration that includes an indication that the UE is to use one or more frequencies identified by the idle mode measurement configuration for obtaining the measurements to be used for minimization of drive test reporting; and
receiving, from the UE, the minimization of drive test reporting based at least in part on the idle mode measurement configuration and the logged measurement configuration.

14. The method of claim 13, further comprising:
transmitting a logged minimization of drive test configuration that includes at least one of frequency or cell information included in the idle mode measurement configuration, wherein the measurements are based on the logged minimization of drive test configuration, which is based on the idle mode measurement configuration.

15. The method of claim 13, further comprising:
transmitting a system information block transmission from the network entity comprising an updated idle mode measurement configuration.

16. The method of claim 15, further comprising:
receiving the minimization of drive test report comprising a measurement of one or more of neighbor radio access technologies of the UE, a measurement of one or more neighbor frequencies of the UE, or a combination thereof.

17. The method of claim 16, further comprising:
transmitting a request for the minimization of drive test report; and
receiving the minimization of drive test report comprising the measurement of a radio access technology of the UE, the measurement of a frequency of the UE, or both.

18. The method of claim 17, further comprising:
transmitting the minimization of drive test report to a trace collection entity.

19. The method of claim 18, wherein the minimization of drive test report comprises a flag indicating that measurements of the minimization of drive test report are collected using the idle mode measurement configuration.

20. The method of claim 13, further comprising:
receiving the minimization of drive test report comprising a measurement of one or more neighbor radio access technologies of the UE, a measurement of one or more neighbor frequencies of the UE, or a combination thereof, and a measurement of a radio access technology of the UE, a measurement of a frequency of the UE, or both.

21. The method of claim 13, wherein identifying the idle mode measurement configuration comprises:
receiving an indication of the minimization of drive test report configuration from an operations, administration and, maintenance network device.

22. The method of claim 21, wherein the operations, administration, and maintenance network device relays the minimization of drive test report configuration to the network entity through an access and mobility management function.

23. A user equipment (UE), comprising:
one or more memories storing processor-executable code; and
one or more processors coupled with the one or more memories and individually or collectively operable to execute the code to cause the UE to:
receive, from a network entity, an idle mode measurement configuration and a logged measurement configuration for performing measurements while the UE is in an idle state or an inactive state;
generate a minimization of drive test report in accordance with the idle mode measurement configuration and the logged measurement configuration and based at least in part on the logged measurement configuration comprising an indication for the UE to use one or more frequencies identified by the idle mode measurement configuration for obtaining the measurements to be used for the minimization of drive test reporting and generation of the minimization of drive test report; and
transmit, to the network entity, the minimization of drive test report based at least in part on the idle mode measurement configuration and the logged measurement configuration.

24. The UE of claim 23, wherein, to determine that the measurements are to be also used for the minimization of drive test reporting, the one or more processors are individually or collectively operable to execute the code to cause the UE to:
identify that the idle mode measurement configuration includes a flag that is indicative that the idle mode measurement configuration is to be also used for the minimization of drive test reporting.

25. A network entity, comprising:
one or more memories storing processor-executable code; and
one or more processors coupled with the one or more memories and individually or collectively operable to execute the code to cause the network entity to:
identify an idle mode measurement configuration for a user equipment (UE) to perform measurements in an idle state or an inactive state of the UE;
transmit, to the UE, the idle mode measurement configuration for the UE to perform the measurements while in the idle state or the inactive state;
transmit a logged measurement configuration that includes an indication that the UE is to use one or more frequencies identified by the idle mode measurement configuration for obtaining the measurements to be used for minimization of drive test reporting; and
receive, from the UE, the minimization of drive test reporting based at least in part on the idle mode measurement configuration and the logged measurement configuration.

26. The network entity of claim 25, wherein the one or more processors are individually or collectively operable to execute the code to cause the network entity to:
transmit a logged minimization of drive test configuration that includes at least one of frequency or cell information included in the idle mode measurement configuration, wherein the measurements are based on the logged minimization of drive test configuration, which is based on the idle mode measurement configuration.

* * * * *